(12) United States Patent
Singh et al.

(10) Patent No.: US 12,003,734 B2
(45) Date of Patent: Jun. 4, 2024

(54) MACHINE LEARNING BASED FLOW DETERMINATION FOR VIDEO CODING

(71) Applicant: QUALCOMM Incorporated, San Diego, CA (US)

(72) Inventors: Ankitesh Kumar Singh, San Diego, CA (US); Hilmi Enes Egilmez, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 77 days.

(21) Appl. No.: 17/676,510

(22) Filed: Feb. 21, 2022

(65) Prior Publication Data

US 2022/0272355 A1 Aug. 25, 2022

Related U.S. Application Data

(60) Provisional application No. 63/153,475, filed on Feb. 25, 2021.

(51) Int. Cl.
*H04N 19/139* (2014.01)
*H04N 5/232* (2006.01)
(Continued)

(52) U.S. Cl.
CPC ......... *H04N 19/139* (2014.11); *H04N 19/172* (2014.11); *H04N 19/186* (2014.11); *H04N 23/632* (2023.01)

(58) Field of Classification Search
None
See application file for complete search history.

(56) References Cited

U.S. PATENT DOCUMENTS

2005/0100229 A1* 5/2005 Becker ................. H04N 19/186
  375/E7.049
2008/0181507 A1* 7/2008 Gope ..................... G06T 7/194
  382/284

(Continued)

FOREIGN PATENT DOCUMENTS

EP 2285113 A2 2/2011

OTHER PUBLICATIONS

Eirikur A., et al., "Scale-Space Flow for End-to-End Optimized Video Compression", 2020 IEEE/CVF Conference on Computer Vision and Pattern Recognition (CVPR), IEEE, Jun. 13, 2020 (Jun. 13, 2020), pp. 8500-8509, XP033805553, 10 Pages, DOI: 10.1109/CVPR42600.2020.00853 [Retrieved on Aug. 3, 2020] Abstract Sections 1, 2, 3.1 and 3.2.

(Continued)

*Primary Examiner* — Mohammad J Rahman
(74) *Attorney, Agent, or Firm* — Polsinelli LLP

(57) ABSTRACT

Systems and techniques are described herein for processing video data. In some aspects, a method can include obtain, by a machine learning system, input video data. The input video data includes one or more luminance components for a current frame. The method can include determining, by the machine learning system, motion information for the luminance component(s) of the current frame and motion information for one or more chrominance components of the current frame using the luminance component(s) for the current frame. In some cases, the method can include determining the motion information for the luminance component(s) based on the luma component(s) of the current frame and at least one reconstructed luma component of a previous frame. In some cases, the method can further include determining the motion information for the chrominance component(s) of the current frame using the motion information determined for the luminance component(s) of the current frame.

30 Claims, 15 Drawing Sheets

(51) Int. Cl.
*H04N 19/172* (2014.01)
*H04N 19/186* (2014.01)
*H04N 23/63* (2023.01)

(56) References Cited

U.S. PATENT DOCUMENTS

2015/0055821 A1* 2/2015 Fotland ............... G06V 10/255
382/103
2019/0043203 A1* 2/2019 Fleishman ............. G06F 18/29
2020/0099952 A1* 3/2020 Kanoh ................ H04N 19/543

OTHER PUBLICATIONS

International Search Report and Written Opinion—PCT/US2022/017296—ISA/EPO—dated Jun. 3, 2022.
Lu G., et al., "DVC: An End-To-End Deep Video Compression Framework", 2019 IEEE/CVF Conference on Computer Vision and Pattern Recognition (CVPR), IEEE, Jun. 15, 2019 (Jun. 15, 2019), XP033686979, pp. 10998-11007, DOI: 10.1109/CVPR.2019.01126 [retrieved on Jan. 8, 2020], Abstract Section 2.3, subsection "Introduction of Notations" in Section 3, Sections 3.2-3.4, Figures 2-4.
Oren R., et al., "Learned Video Compression", 2019 IEEE/CVF International Conference on Computer Vision(ICCV), IEEE, Oct. 27, 2019 (Oct. 27, 2019), pp. 3453-3462, XP033723727, 10 Pages, DOI: 10.1109/ICCV.2019.00355 [Retrieved on Feb. 24, 2020] Abstract Sub-section "Optical flow Estimation" in Section 1.2 Section 2.1, Figure 3 Paragraph Bridging pp. 3459 and 3460.

* cited by examiner

1100

Obtain, By A Machine Learning System, Input Video Data, The Input Video Data Including At Least One Luminance Component For A Current Frame
1102

Determine, By The Machine Learning System, Motion Information For The At Least One Luminance Component Of The Current Frame And Motion Information For One Or More Chrominance Components Of The Current Frame Using The At Least One Luminance Component For The Current Frame
1104

FIG. 11

MACHINE LEARNING BASED FLOW DETERMINATION FOR VIDEO CODING

CROSS-REFERENCE TO RELATED APPLICATIONS

This application claims the benefit of U.S. Provisional Application No. 63/153,475, filed Feb. 25, 2021, which is hereby incorporated by reference, in its entirety and for all purposes.

FIELD OF THE DISCLOSURE

The present disclosure generally relates to image and video coding, including encoding (or compression) and decoding (decompression) of images and/or video. For example, aspects of the present disclosure relate to techniques for determining flow information for luma and chroma components of one or more image frames or pictures (e.g., video frames/pictures).

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

Systems and techniques are described for coding (e.g., encoding and/or decoding) image and/or video content using one or more machine learning systems. According to at least one example, a method is provided for processing video data. The method includes: obtaining, by a machine learning system, input video data, the input video data including at least one luminance component for a current frame; and determining, by the machine learning system, motion information for the at least one luminance component of the current frame and motion information for one or more chrominance components of the current frame using the at least one luminance component for the current frame.

In another example, an apparatus for processing video data is provided that includes at least one memory (e.g., configured to store data, such as virtual content data, one or more images, etc.) and one or more processors (e.g., implemented in circuitry) coupled to the at least one memory. The one or more processors are configured to and can: obtain, using a machine learning system, input video data, the input video data including at least one luminance component for a current frame; and determine, using the machine learning system, motion information for the at least one luminance component of the current frame and motion information for one or more chrominance components of the current frame using the at least one luminance component for the current frame.

In another example, a non-transitory computer-readable medium is provided that has stored thereon instructions that, when executed by one or more processors, cause the one or more processors to: obtain, using a machine learning system, input video data, the input video data including at least one luminance component for a current frame; and determine, using the machine learning system, motion information for the at least one luminance component of the current frame and motion information for one or more chrominance components of the current frame using the at least one luminance component for the current frame.

In another example, an apparatus for processing video data is provided. The apparatus includes: means for obtaining input video data, the input video data including at least one luminance component for a current frame; and means for determining motion information for the at least one luminance component of the current frame and motion information for one or more chrominance components of the current frame using the at least one luminance component for the current frame.

In some aspects, one or more of the methods, apparatuses, and computer-readable medium described above further comprise: determining, by the machine learning system using the motion information for the at least one luminance component of the current frame and the motion information for the one or more chrominance components of the current frame, a warping parameter for the at least one luminance component of the current frame and one or more warping parameters for one or more chrominance components of the current frame; and determining one or more inter-frame predictions for the current frame using the warping parameter for the at least one luminance component of the current frame and the one or more warping parameters for the one or more chrominance components of the current frame.

In some aspects, the one or more inter-frame predictions are determined at least in part by applying an interpolation operation using the warping parameter for the at least one luminance component of the current frame and the one or more warping parameters for the one or more chrominance components of the current frame.

In some aspects, the interpolation operation includes a trilinear interpolation operation.

In some aspects, the warping parameter for the at least one luminance component of the current frame and the one or more warping parameters for the one or more chrominance components of the current frame include space-scale flow (SSF) warping parameters.

In some aspects, the SSF warping parameters include learned scale-flow vectors.

In some aspects, to determine the motion information for the at least one luminance component of the current frame and the motion information for the one or more chrominance components of the current frame using the at least one luminance component for the current frame, one or more of the methods, apparatuses, and computer-readable medium described above further comprise: determining the motion information for the at least one luminance component of the current frame based on the at least one luminance component of the current frame and at least one reconstructed luma component of a previous frame; and determining the motion information for the one or more chrominance components of the current frame using the motion information determined for the at least one luminance component of the current frame.

In some aspects, the motion information for the one or more chrominance components of the current frame is determined using a convolutional layer of the machine learning system.

In some aspects, to determine the motion information for the one or more chrominance components of the current frame, one or more of the methods, apparatuses, and computer-readable medium described above further comprise sampling the motion information determined for the at least one luminance component of the current frame.

In some aspects, the current frame includes a video frame.

In some aspects, the one or more chrominance components include at least one chrominance-blue component and at least one chrominance-red component.

In some aspects, the current frame has a luminance-chrominance (YUV) format. In some cases, the YUV format is a YUV 4:2:0 format.

In some aspects, apparatuses described herein can comprise or be part of a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 11 is a flow diagram illustrating an example of a process for processing video data, in accordance with some examples.

DETAILED DESCRIPTION

Figure 1:
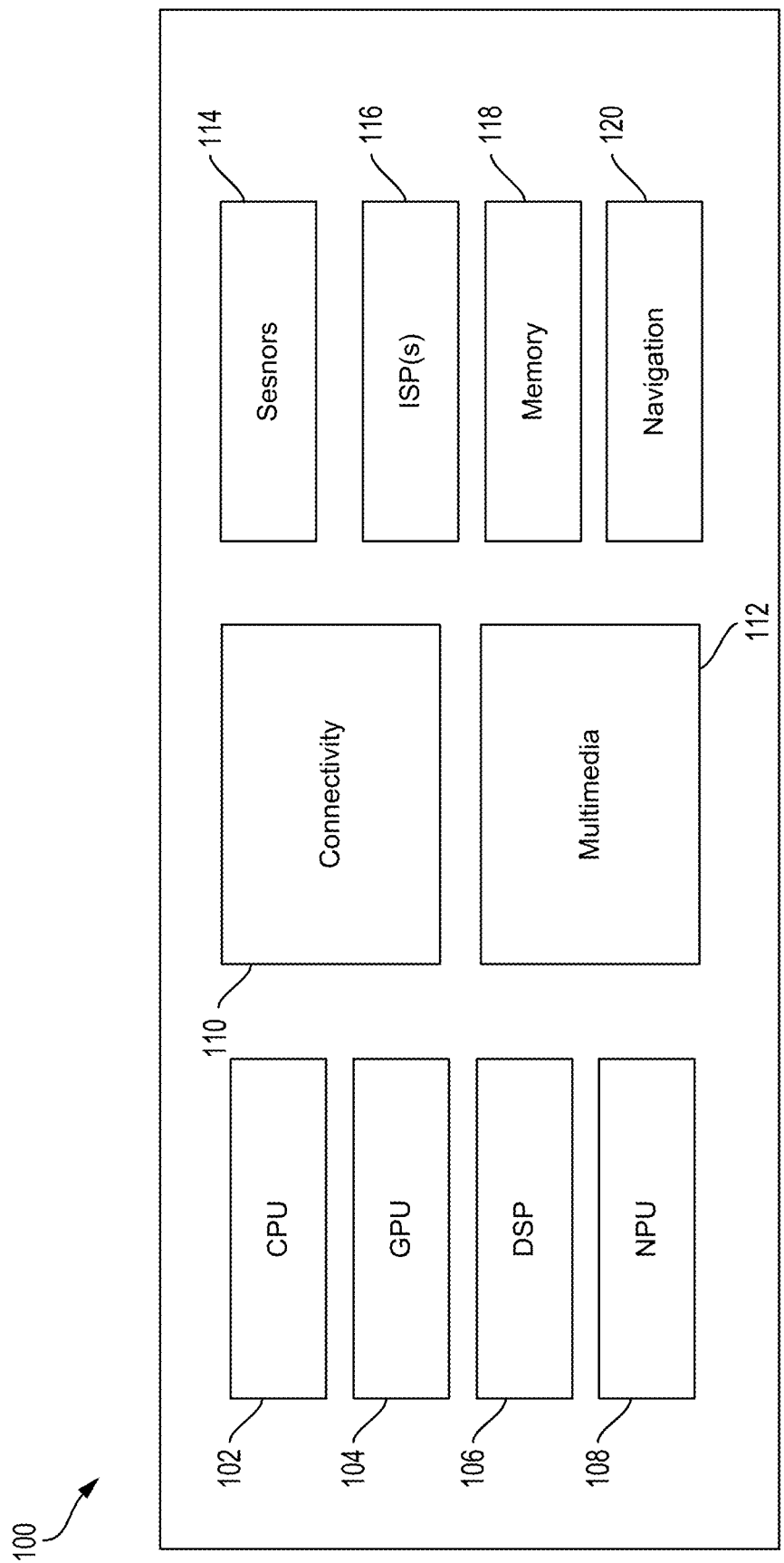
FIG. 1 illustrates an example implementation of a system-on-a-chip (SOC)

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding standard. Example video coding standards include high-efficiency video coding (HEVC), advanced video coding (AVC), moving picture experts group (MPEG) coding, and versatile video coding (VVC). Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

Machine learning (ML) based systems can be used to perform image and/or video coding. In general, ML is a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. CNNs, for example, may be trained to recognize a hierarchy of features. Computation in CNN architectures may be distributed over a population of processing nodes, which may be configured in one or more computational chains. These multi-layered architectures may be trained one layer at a time and may be fine-tuned using back propagation.

In many cases, deep learning-based systems are designed as combination of an autoencoder sub-network (the encoder sub-network) and a second sub-network (also referred to in some cases as a hyperprior network) responsible for learning a probabilistic model over quantized latents used for entropy coding (a decoder sub-network). In some cases, there can be other sub-networks of the decoder. Such a deep learning-based system architecture can be viewed as a combination of a transform plus quantization module (or encoder sub-network) and the entropy modelling sub-network module.

Most existing deep learning-based architectures for video compression are designed to operate in non-subsampled input formats, such as RGB, YUV 4:4:4, or other non-subsampled input formats. However, video coding standards, such as HEVC and VVC, are designed to support the YUV 4:2:0 color format in their respective main profiles. To support 4:2:0 YUV format, deep learning-based architectures that are designed to operate in non-subsampled input formats have to be modified.

Systems, apparatuses, processes (also referred to as methods), and computer-readable media (collectively referred to as "systems and techniques") are described herein that provide an ML-based system (e.g., a deep-learning based system) that can use one color component of one or more frames (e.g., a video frame) to estimate information for the color component and another color component of the frame. In some aspects, the ML-based system may be designed for processing input data that has luminance-chrominance (YUV) input formats. In such aspects, the ML-based system can use a luma component of both a current frame and a previously-reconstructed frame (e.g., reconstructed by the ML-based system) to estimate motion information (e.g., flow information, such as optical flow information) for both the luma component and one or more chroma components. In some cases, after learning the motion information for the luma component, a convolutional layer with down sampling can be used to learn the motion information (e.g., flow information) for the one or more chroma components. In some cases, the motion information for the one or more chroma components can be obtained by directly subsampling the motion information for the luma component (e.g., without using a convolutional layer). Such a technique can be performed for all components of the frame. Using such techniques, the ML-based system can determine chroma motion information (e.g., flow information) without the need to have chroma information coded as part of latent data or a bitstream (e.g., reducing the need to send side information with the chroma information).

As noted above, the ML-based system may be designed for processing input data that has a YUV input format. The YUV format includes a luminance channel (Y) and a pair of chrominance channels (U and V). The U channel can be referred to as the chrominance (or chroma)-blue channel and the U channel can be referred to as the chrominance (or chroma)-red channel. In some cases, the luminance (Y) channel or component can also be referred to as the luma channel or component. In some cases, the chrominance (U and V) channels or components can also be referred to as the chroma channels or components. YUV input formats can include YUV 4:2:0, YUV 4:4:4, YUV 4:2:2, among others. In some cases, the systems and techniques described herein can be designed to handle other input formats, such as data having a Y-Chroma Blue (Cb)-Chroma Red (Cr) (YCbCr) format, a red-green-blue (RGB) format, and/or other format. The ML-based system described herein can encode and/or decode stand-alone frames (also referred to as images) and/or video data that includes multiple frames.

Further details and additional aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using machine learning techniques according to aspects of the present disclosure discussed herein. By using deep learning architectures to perform video compression and/or decompression, aspects of the present disclosure can increase the efficiency of video compression and/or decompression on a device. For example, a device using the video coding techniques described can compress video more efficiently using the machine learning based techniques, can transmit the compressed video to another device, and the other device can decompress the compressed video more efficiently using the machine learning based techniques described herein.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
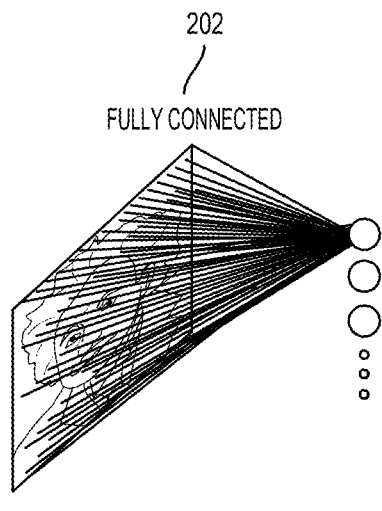
FIG. 2A illustrates an example of a fully connected neural network.
Figure 2B:
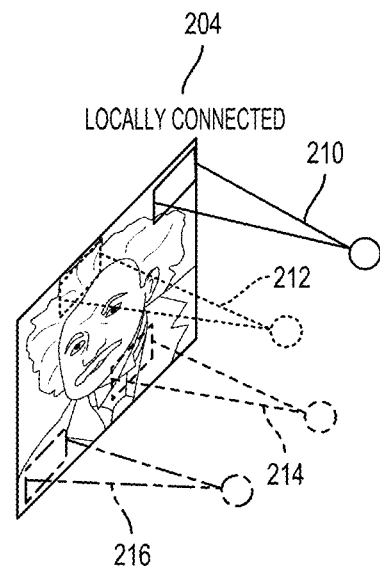
FIG. 2B illustrates an example of a locally connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
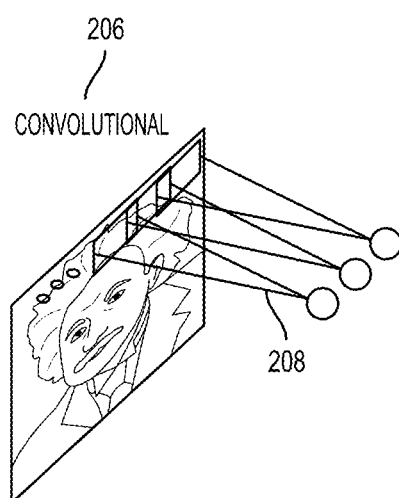
FIG. 2C illustrates an example of a convolutional neural network.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
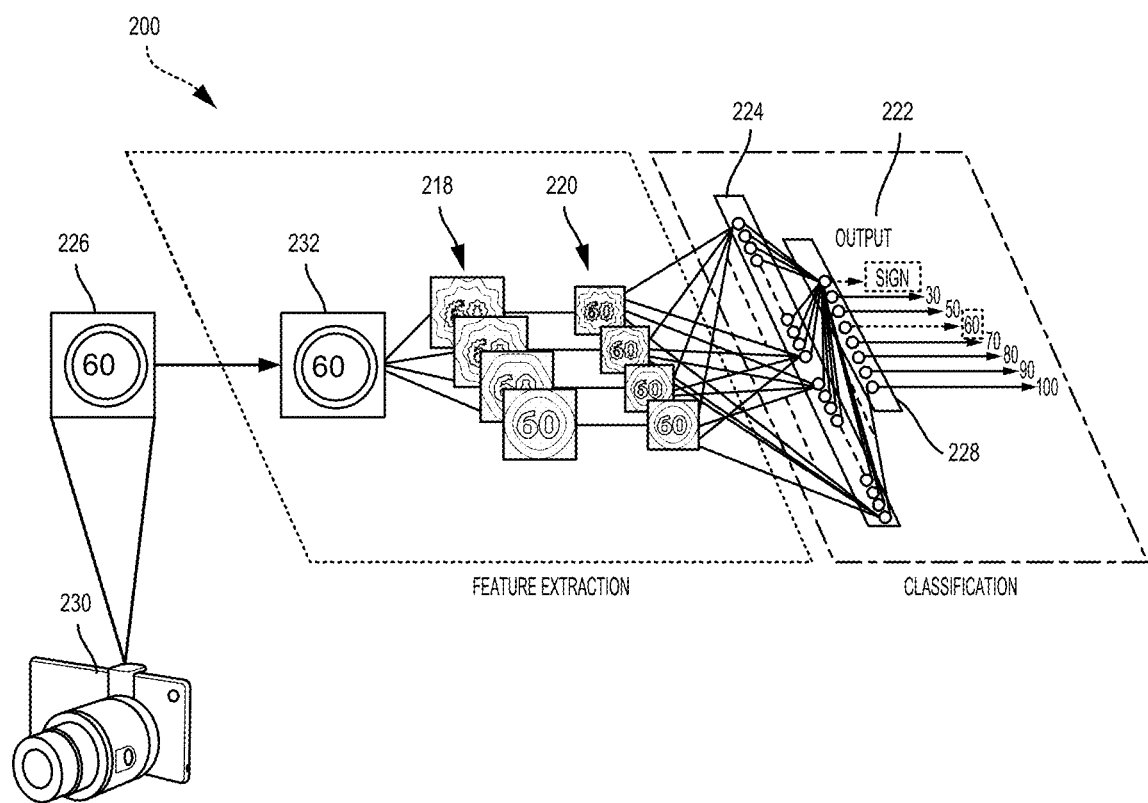
FIG. 2D illustrates a detailed example of a deep convolutional network (DCN) designed to recognize visual features from an image.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-theart performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
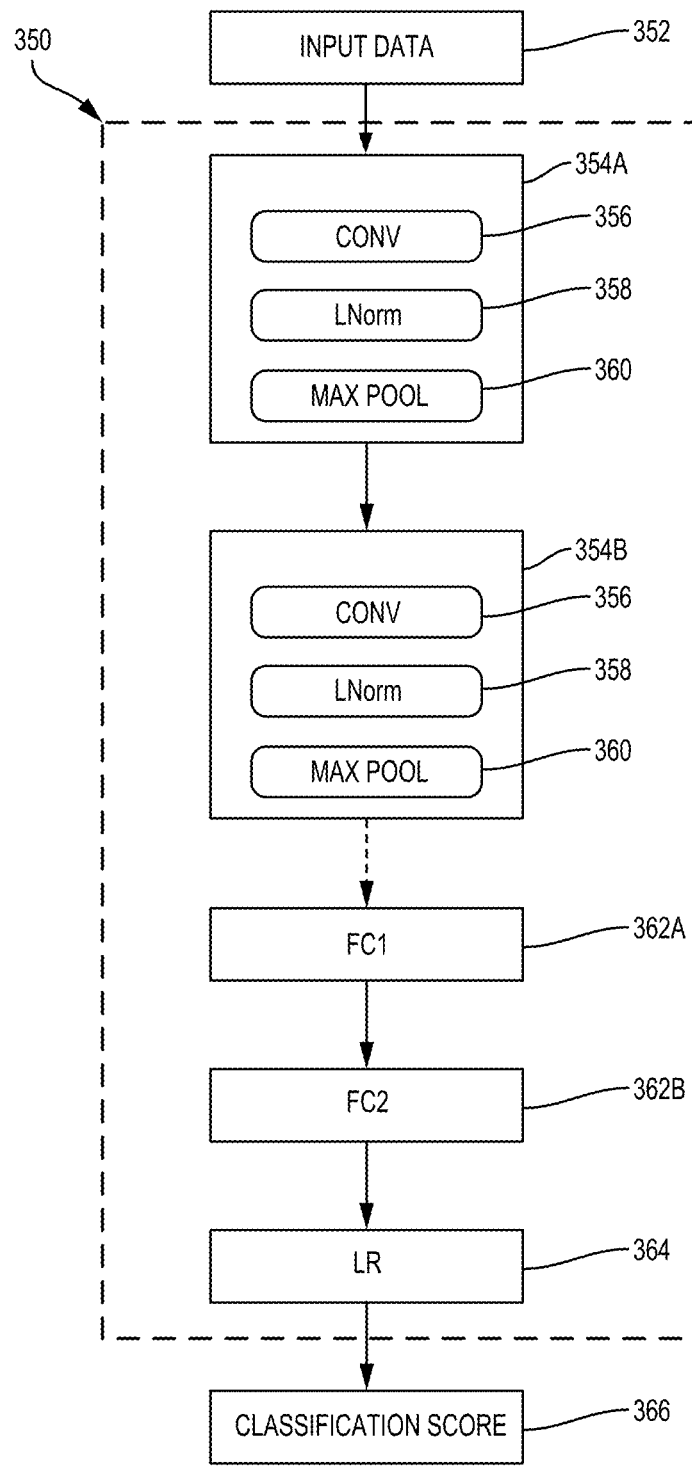
FIG. 3 is a block diagram illustrating a deep convolutional network (DCN)

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362A, 362B, 364 of the deep convolutional network 350 are weights (not shown) that are to be updated. The output of each of the layers (e.g., 356, 358, 360, 362A, 362B, 364) may serve as an input of a succeeding one of the layers (e.g., 356, 358, 360, 362A, 362B, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

As noted above, digital video data can include large amounts of data, which can place a significant burden on communication networks as well as on devices that process and store the video data. For instance, recording uncompressed video content generally results in large file sizes that greatly increase as the resolution of the recorded video content increases. In one illustrative example, uncompressed 16-bit per channel video recorded in 1080p/24 (e.g. a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth™, or other wireless networks), and can make up a large portion of consumer internet traffic. Despite advances in the amount of available bandwidth in wireless networks, it may still be desirable to reduce the amount of bandwidth used to deliver video content in these networks.

Because uncompressed video content can result in large files that may involve sizable memory for physical storage and considerable bandwidth for transmission, video coding techniques can be utilized to compress and then decompress such video content.

To reduce the size of video content—and thus the amount of storage involved to store video content—and the amount of bandwidth involved in delivering video content, various video coding techniques can be performed according to a particular video coding Standard, such as HEVC, AVC, MPEG, VVC, among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

In general, an encoding device encodes video data according to a video coding Standard to generate an encoded video bitstream. In some examples, an encoded video bitstream (or "video bitstream" or "bitstream") is a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

According to the HEVC standard, transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

After performing prediction using intra- and/or inter-prediction, the encoding device can perform transformation and quantization. For example, following prediction, the encoding device may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Video coding systems and techniques defined by the various video coding Standards (e.g., the HEVC video coding techniques described above) may be able to retain much of the information in raw video content and may be defined a priori based on signal processing and information theory concepts. However, in some cases, a machine learning (ML)-based image and/or video system can provide benefits over non-ML based image and video coding systems, such as a deep learning-based end-to-end video coding (DLEC) system. As described above, many deep learning-based systems are designed as combination of an autoencoder sub-network (the encoder sub-network) and a second sub-network responsible for learning a probabilistic model over quantized latents used for entropy coding. Such an architecture can be viewed as a combination of a transform, quantization module (encoder sub-network) and the entropy modelling sub-network module.

Figure 4:
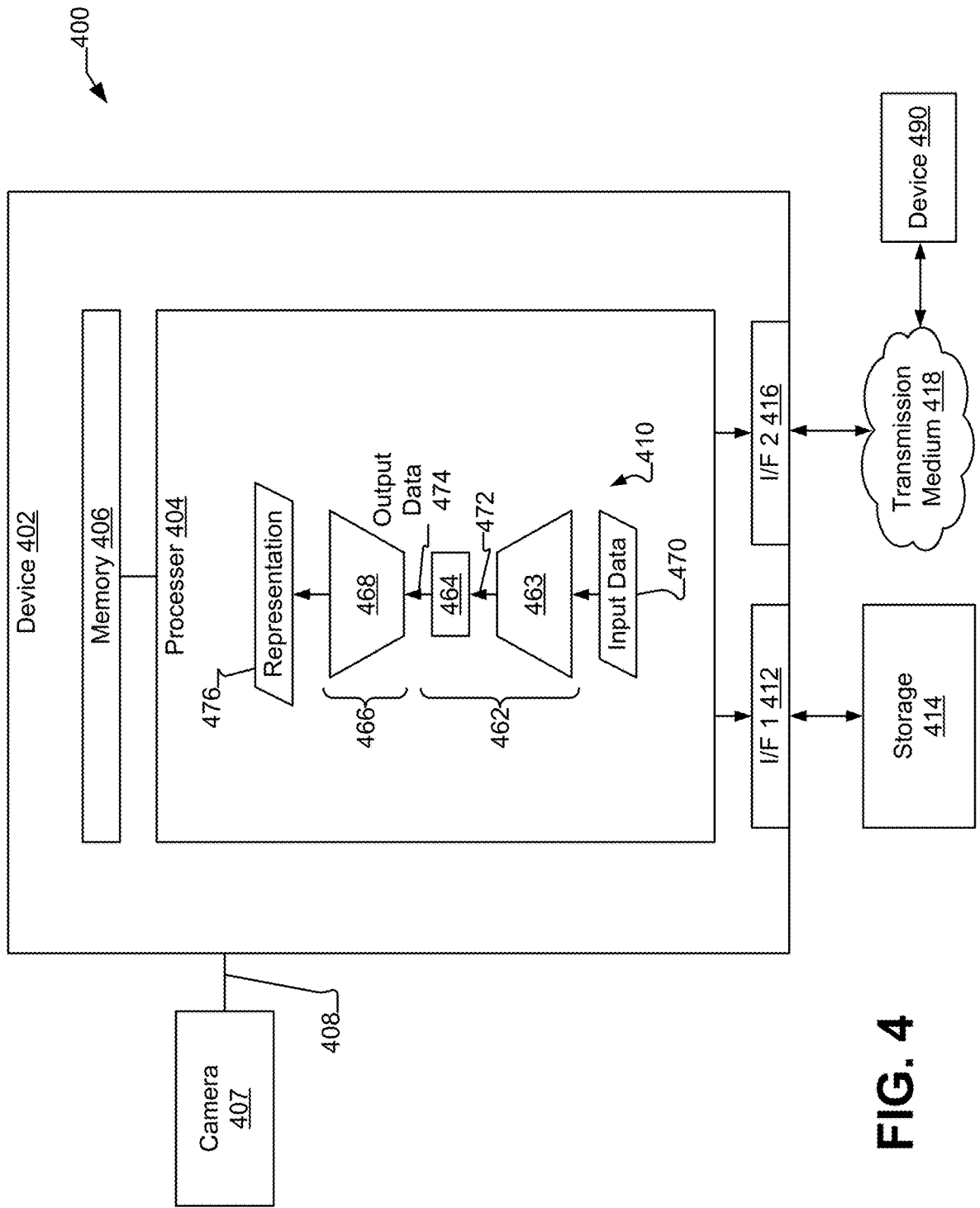
FIG. 4 is a diagram illustrating an example of a system including a device operable to perform image and/or video coding (encoding and decoding) using a neural network-based system, in accordance with some examples.

FIG. 4 depicts a system 400 that includes a device 402 configured to perform video encoding and decoding using a deep learning-based system 410. The device 402 is coupled to a camera 407 and a storage medium 414 (e.g., a data storage device). In some implementations, the camera 407 is configured to provide the image data 408 (e.g., a video data stream) to the processor 404 for encoding by the deep learning-based system 410. In some implementations, the device 402 can be coupled to and/or can include multiple cameras (e.g., a dual-camera system, three cameras, or other number of cameras). In some cases, the device 402 can be coupled to a microphone and/or other input device (e.g., a keyboard, a mouse, a touch input device such as a touchscreen and/or touchpad, and/or other input device). In some examples, the camera 407, the storage medium 414, microphone, and/or other input device can be part of the device 402.

The device 402 is also coupled to a second device 490 via a transmission medium 418, such as one or more wireless networks, one or more wired networks, or a combination thereof. For example, the transmission medium 418 can include a channel provided by a wireless network, a wired network, or a combination of a wired and wireless network. The transmission medium 418 may form part of a packet-based network, such as a local area network, a wide-area network, or a global network such as the Internet. The transmission medium 418 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 402 includes one or more processors (referred to herein as "processor") 404 coupled to a memory 406, a first interface ("I/F 1") 412, and a second interface ("I/F 2") 416. The processor 404 is configured to receive image data 408 from the camera 407, from the memory 406, and/or from the storage medium 414. The processor 404 is coupled to the storage medium 414 via the first interface 412 (e.g., via a memory bus) and is coupled to the transmission medium 418 via the second interface 416 (e.g., a network interface device, a wireless transceiver and antenna, one or more other network interface devices, or a combination thereof).

The processor 404 includes the deep learning-based system 410. The deep learning-based system 410 includes an encoder portion 462 and a decoder portion 466. In some implementations, the deep learning-based system 410 can include one or more autoencoders. The encoder portion 462 is configured to receive input data 470 and to process the input data 470 to generate output data 474 at least partially based on the input data 470.

In some implementations, the encoder portion 462 of the deep learning-based system 410 is configured to perform lossy compression of the input data 470 to generate the output data 474, so that the output data 474 has fewer bits than the input data 470. The encoder portion 462 can be trained to compress input data 470 (e.g., images or video frames) without using motion compensation based on any previous representations (e.g., one or more previously reconstructed frames). For example, the encoder portion 462 can compress a video frame using video data only from that video frame, and without using any data of previously reconstructed frames. Video frames processed by the encoder portion 462 can be referred to herein as intra-predicted frame (I-frames). In some examples, I-frames can be generated using traditional video coding techniques (e.g., according to HEVC, VVC, MPEG-4, or other video coding Standard). In such examples, the processor 404 may include or be coupled with a video coding device (e.g., an encoding device) configured to perform block-based intra-prediction, such as that described above with respect to the HEVC Standard. In such examples, the deep learning-based system 410 may be excluded from the processor 404.

In some implementations, the encoder portion 462 of the deep learning-based system 410 can be trained to compress input data 470 (e.g., video frames) using motion compensation based on previous representations (e.g., one or more previously reconstructed frames). For example, the encoder portion 462 can compress a video frame using video data from that video frame and using data of previously reconstructed frames. Video frames processed by the encoder portion 462 can be referred to herein as intra-predicted frame (P-frames). The motion compensation can be used to determine the data of a current frame by describing how the pixels from a previously reconstructed frame move into new positions in the current frame along with residual information.

As shown, the encoder portion 462 of the deep learning-based system 410 can include a neural network 463 and a quantizer 464. The neural network 463 can include one or more convolutional neural networks (CNNs), one or more fully-connected neural networks, one or more gated recurrent units (GRUs), one or more Long short-term memory (LSTM) networks, one or more ConvRNNs, one or more ConvGRUs, one or more ConvLSTMs, one or more GANs, any combination thereof, and/or other types of neural network architectures that generate(s) intermediate data 472. The intermediate data 472 is input to the quantizer 464. Examples of components that may be included in the encoder portion 462 are illustrated in FIG. 6-FIG. 10.

The quantizer 464 is configured to perform quantization and in some cases entropy coding of the intermediate data 472 to produce the output data 474. The output data 474 can include the quantized (and in some cases entropy coded) data. The quantization operations performed by the quantizer 464 can result in the generation of quantized codes (or data representing quantized codes generated by the deep learning-based system 410) from the intermediate data 472. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding Standards. In some examples, the quantization and/or entropy coding operations can be done by the deep learning-based system 410. In one illustrative example, the deep learning-based system 410 can be trained using supervised training, with residual data being used as input and quantized codes and entropy codes being used as known output (labels) during the training.

The decoder portion 466 of the deep learning-based system 410 is configured to receive the output data 474 (e.g., directly from quantizer 464 and/or from the storage medium 414). The decoder portion 466 can process the output data 474 to generate a representation 476 of the input data 470 at least partially based on the output data 474. In some examples, the decoder portion 466 of the deep learning-based system 410 includes a neural network 468 that may include one or more CNNs, one or more fully-connected neural networks, one or more GRUs, one or more Long short-term memory (LSTM) networks, one or more ConvRNNs, one or more ConvGRUs, one or more ConvLSTMs, one or more GANs, any combination thereof, and/or other types of neural network architectures. Examples of components that may be included in the decoder portion 466 are illustrated in FIG. 6-FIG. 10.

The processor 404 is configured to send the output data 474 to at least one of the transmission medium 418 or the storage medium 414. For example, the output data 474 may be stored at the storage medium 414 for later retrieval and decoding (or decompression) by the decoder portion 466 to generate the representation 476 of the input data 470 as reconstructed data. The reconstructed data can be used for various purposes, such as for playback of video data that has been encoded/compressed to generate the output data 474. In some implementations, the output data 474 may be decoded at another decoder device that matches the decoder portion 466 (e.g., in the device 402, in the second device 490, or in another device) to generate the representation 476 of the input data 470 as reconstructed data. For instance, the second device 490 may include a decoder that matches (or substantially matches) the decoder portion 466, and the output data 474 may be transmitted via the transmission medium 418 to the second device 490. The second device 490 can process the output data 474 to generate the representation 476 of the input data 470 as reconstructed data.

The components of the system 400 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 400 is shown to include certain components, one of ordinary skill will appreciate that the system 400 can include more or fewer components than those shown in FIG. 4. For example, the system 400 can also include, or can be part of a computing device that includes, an input device and an output device (not shown). In some implementations, the system 400 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 4.

In some implementations, the system 400 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

In one example, the deep learning-based system 410 can be incorporated into a portable electronic device that includes the memory 406 coupled to the processor 404 and configured to store instructions executable by the processor 404, and a wireless transceiver coupled to an antenna and to the processor 404 and operable to transmit the output data 474 to a remote device.

As noted above, deep learning-based systems are typically designed to process non-subsampled input formats, such as RGB or YUV 4:4:4. Examples of image and video coding schemes targeting RGB input are described in J. Balle, D. Minnen, S. Singh, S. J. Hwang, N. Johnston, "Variational image compression with a scale hyperprior", ICLR, 2018 (referred to as the "J. Balle Paper") and D. Minnen, J. Balle, G. Toderici, "Joint Autoregressive and Hierarchical Priors for Learned Image Compression", CVPR 2018 (referred to as the "D. Minnen Paper"), which are hereby incorporated by reference in their entirety and for all purposes.

Figure 5:
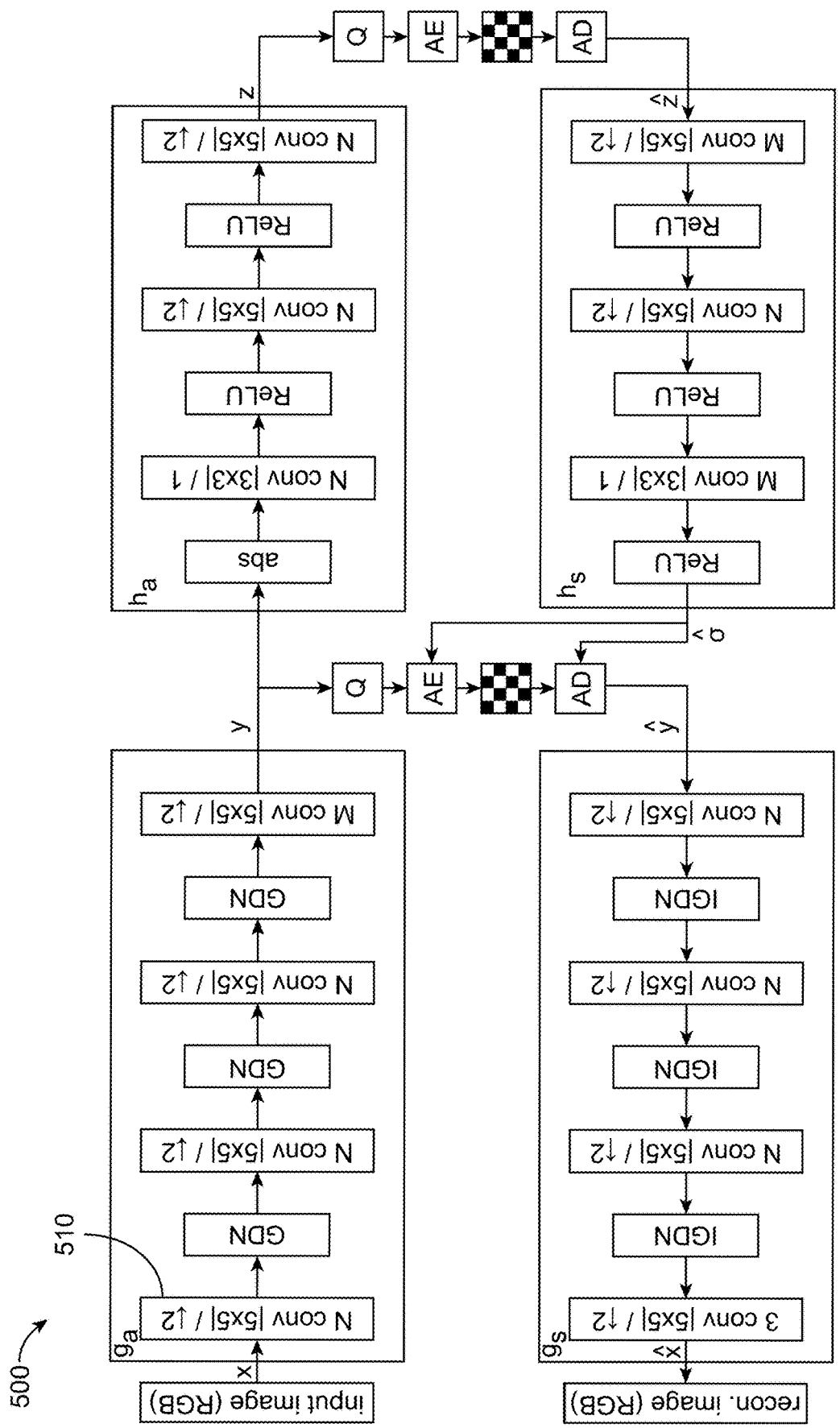
FIG. 5 is a diagram illustrating an example of an end-to-end neural network based image and video coding system for input having a red-green-blue (RGB) format, in accordance with some examples.

FIG. 5 is a diagram illustrating an example of a deep learning-based system 500. The $g_a$ and $g_s$ sub-networks in the deep learning-based system of FIG. 5 correspond to the encoder sub-network (e.g., the encoder portion 462) and the decoder sub-network (e.g., the decoder portion 466), respectively. The $g_a$ and $g_s$ sub-networks of FIG. 5 are designed for three-channel RGB input, where all three R, G, and B input channels go through and are processed by the same neural network layers (the convolutional layers and generalized divisive normalization (GDN) layers). The neural network layers can include convolutional layers (including convolutional layer 510) that perform convolutional operations and GDN and/or inverse-GDN (IGDN) non-linearity layers that implement local divisive normalization. Local divisive normalization is a type of transformation that has been shown to be particularly suitable for density modelling and compression of images. deep learning-based systems (such as that shown in FIG. 5) target input channels with similar statistical characteristic, such as RGB data (where statistical properties of the different R, G, and B channels are similar).

While many deep learning-based systems are designed to process RGB input, most image and video coding systems use YUV input formats (e.g., in many cases the YUV 4:2:0 input format). The chrominance (U and V) channels of data in the YUV format can be subsampled with respect to the luminance (Y) channel. The subsampling results in a minimal impact on visual quality (e.g., there is no significant or noticeable impact on visual quality). Subsampled formats include the YUV 4:2:0 format, the YUV 4:2:2 format, and/or other YUV formats. The correlation across channels is reduced in the YUV format, which may not be the case with other color formats (e.g., the RGB format). Further, the statistics of the luminance (Y) and chrominance (U and V) channels are different. For instance, the U and V channels have smaller variance as compared to the luminance channel, whereas in the RGB formats for example, the statistical properties of the different R, G, and B channels are more similar. Video coders-decoders (or CODECs) are designed according to the input characteristics of data (e.g., a CODEC can encode and/or decode data according to the input format of the data). For example, if the chrominance channels of a frame are subsampled (e.g., the chrominance channels are half the resolution as compared to the luminance channel), then when a CODEC predicts a block of the frame for motion compensation, the luminance block would be twice as large for both width and height as compared to the chrominance blocks. In another example, the CODEC can determine how many pixels are going to be encoded or decode for chrominance and luminance, among others.

To support YUV formats (e.g., the YUV 4:2:0 format), deep learning-based architectures must be modified. For example, if RGB input data (which, as noted above, most deep learning-based systems are designed to process) is replaced with YUV 4:4:4 input data (where all channels have the same dimension), the performance of the deep learning-based system processing the input data is reduced due to different statistical characteristics of the luminance (Y) and chrominance (U and V) channels. As noted above, the chrominance (U and V) channels are subsampled in some YUV formats, such as in the case of YUV 4:2:0. For instance, for content having the YUV 4:2:0 format, the U and V channel resolution is half of the Y channel resolution (the U and V channels have a size that is a quarter of the Y channel, due to the width and height being halved). Such subsampling can cause the input data to be incompatible with the input of the deep learning-based system. The input data is the information that the deep learning-based system is attempting to encode and/or decode (e.g., a YUV frame that includes three channels, including the luminance (Y) and chrominance (U and V) channels).

In some end-to-end video coding deep learning-based systems, autoencoders are used for coding intra frame, motion vectors (e.g., dense optical flow), and residual of motion compensated frames with respect to the original frames. In one example, a flow autoencoder can be used to jointly learn to code optical flow as well as a scale-space, and a residual autoencoder codes the residual between a warped predicted frame and an original frame, all in the RGB domain.

As noted above, systems and techniques are described herein that provide an ML-based system (e.g., including one or more deep learning-based architectures) that efficiently supports one or more YUV formats (e.g., the YUV 4:2:0 format). The deep learning-based architecture(s) can encode and/or decode stand-alone frames (or images) and/or video data that includes multiple frames. For instance, the ML-based system can obtain as input a luma component of a current frame and a luma component of a previously-reconstructed frame, which may be reconstructed by a previous instance of the ML-based system. The ML-based system can process the luma components of the current and previous frames to estimate motion information (e.g., flow information, such as optical flow information) for the luma component of the current frame. Using the luma component of the current frame, the ML-based system can then determine (e.g., estimate) motion estimation (e.g., flow information, such as optical flow information) for one or more chroma components of the current frame. Such a technique can be performed for all components of the frame. Further details are described below.

Figure 6:
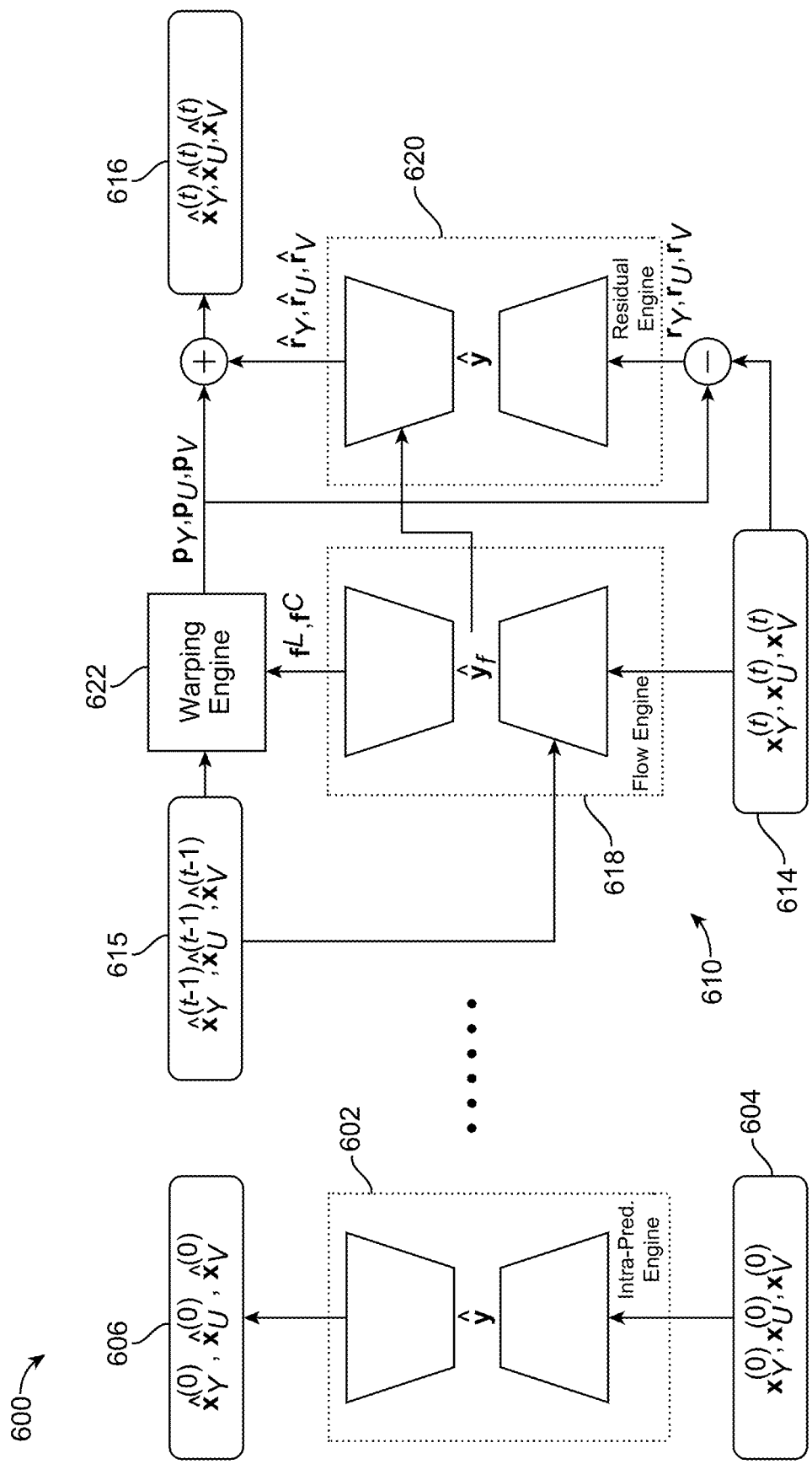
FIG. 6 is a diagram illustrating an example of a space-scale flow (SSF) neural network architecture configured to process one or more luminance-chrominance (YUV) input formats (e.g., 4:2:0 YUV input format) that can be part of an end-to-end neural network based image and video coding system, in accordance with some examples.

FIG. 6 is a diagram illustrating an example of neural network architecture of a deep learning-based system 600 configured to perform video coding. The neural network architecture of FIG. 6 includes an intra-prediction engine 602 and an inter-prediction engine 610. The intra-prediction engine 602 and the inter-prediction engine 610 may include autoencoders (e.g., Variational Autoencoders (VAE)) as shown in FIG. 6, however may include other types of neural network architectures in other implementations. As shown, the intra-prediction engine 602 processes pixel information of an input frame 604 to produce a latent representation (denoted as $\hat{y}$) of the input frame 604. The input frame 604 includes a luma component (denoted as $X_Y^{(0)}$) and two chroma components (denoted as $X_U^{(0)}$ and $X_V^{(0)}$) for each pixel of the input frame 604. The latent representation can also be referred to as a bitstream, which includes a number of bits that is a coded version of the input frame 604. Based on the latent representation $\hat{y}$ (or a latent representation/bitstream received from another device), a decoder sub-network of the intra-prediction engine 602 can generate a reconstructed frame 606 (denoted as $\hat{X}_Y^{(0)}$, $\hat{X}_U^{(0)}$, $\hat{X}_V^{(0)}$, with the "hat" over the components indicating reconstructed values), which is a reconstructed version of the input frame 604.

The inter-prediction engine 610 includes a flow engine 618, a residual engine 620, and a warping engine 622. As shown, the flow engine 618 obtains as input a luma component (denoted as $X_Y^{(t)}$) of a current frame 614 (at time t) and a reconstructed luma component (denoted as $\hat{X}_Y^{(t-1)}$) of a previous frame 615 (at a previous time t−1). Using the luma component $X_Y^{(t)}$ and the luma component $\hat{X}_Y^{(t-1)}$, the flow engine 618 generates a latent representation (denoted as $\hat{y}_f$) of motion information (e.g., flow information) for the luma component $X_Y^{(t)}$ for the current frame 614. The motion information may include optical flow information (e.g., a plurality of motion or displacement vectors and in some cases a scale component per pixel or sample), indicating a movement of the pixels of the current frame 614 (at time t) relative to the previous frame 615 (at time t−1). The latent representation $\hat{y}_f$ can also be referred to as a bitstream, and can include a number of bits that represent a coded version of the luma component $X_Y^{(t)}$ for the current frame 614. Because the flow engine 618 processes the luma component $X_Y^{(t)}$ for the current frame 614 and not the chroma components, the latent representation $\hat{y}_f$ (bitstream) is reduced in size as compared to using all components of the current frame 614 to determine the motion information.

Using the latent representation $\hat{y}_f$ of the luma component $X_Y^{(t)}$ (or a latent representation or bitstream received from another device that represents a luma component of a frame), the flow engine 618 determines motion information (denoted as $f^L$) for the luma component $X_Y^{(t)}$ of the current frame 614 and also determines motion information (denoted as $f^C$) for the chroma components $X_U^{(t)}$, $X_V^{(t)}$ of the current frame 614. Details of determining or estimating the motion information for a chroma component based on determined motion information for a luma component are described below with respect to FIG. 7A and FIG. 7B.

The warping engine 622 is configured to perform warping using the motion information ($f^L$ and $f^C$) determined for the luma $X_Y^{(t)}$ and chroma components $X_U^{(t)}$, $X_V^{(t)}$ of the current frame 614 (at time t). For example, the warping engine 622 can warp the pixels of the current frame 614 (at time t) by an amount indicated by the motion information ($f^L$ and $f^C$) of the luma $X_Y^{(t)}$ and chroma components $X_U^{(t)}$, $X_V^{(t)}$ for the current frame 614. In some aspects, the warping engine 622 can perform space-scale flow (SSF) warping. For example, the SSF warping may apply a trilinear interpolation to generate inter-frame predictions from learned scale-flow vectors, where the predictors can be formulated as follows:

$p_Y$:=trilinear($x_Y, f^L$)

$p_U$:=trilinear($x_U, f^C$), and $p_V$:=trilinear($x_V, f^C$)

such that:

$p_Y[x,y]=x_Y[x+v_x^L[x,y], y+v_y^L[x,y], s^L[x,y]]$ $p_U[x,y]=x_U[x+v_x^C[x,y], y+v_y^C[x,y], s^C[x,y]]$ $p_V[x,y]=x_V[x+v_x^C[x,y], y+v_y^C[x,y], s^C[x,y]]$   Equation (1)

The above trilinear interpolation can be performed on a per-component basis (e.g., for each luma component and for each individual U and V chroma component) based on one or more warping parameters determined based on the motion information ($f^L$ and $f^C$) of the luma $X_Y^{(t)}$ and chroma components $X_U^{(t)}$. For example, the warping parameters may include $v_x^*$ that represents a horizontal component (in an x-direction) of a motion or displacement vector, $v_y^*$ that represents a vertical component (in a y-direction) of the motion or displacement vector, and s (referred to as a scale field) that represents a progressively smoothed version of the reconstructed frames that is combined with the spatial motion/displacement information ($v_x$ and $v_y$).

The output from the warping engine 622 (after the warping is performed by the warping engine 622) includes predictions denoted in FIG. 6 as $p_Y$, $p_U$, $p_V$, where $p_Y$ corresponds to a prediction for the luma component luma $X_Y^{(t)}$, $p_U$ corresponds to a prediction for the chroma component $X_U^{(t)}$, and $p_V$ corresponds to a prediction for the chroma component $X_V^{(t)}$ of the current frame 614.

The deep learning-based system 600 may then subtract the predictions $p_Y$, $p_U$, $p_V$ from the corresponding luma $X_Y^{(t)}$ and chroma $X_U^{(t)}$, $X_V^{(t)}$ components of the current frame 614 to obtain residual signals, including residual signal $r_Y$ for the luma component, residual signal $r_U$ for the chroma component $X_U^{(t)}$, and residual signal $r_V$ for the chroma component $X_V^{(t)}$. The residual engine 620 may generate a latent representation (denoted as $\hat{y}$) for the residual. Using the latent representation $\hat{y}$ of the residual (or a latent representation of a residual received from another device), the residual engine 620 can generate a reconstructed residual for the current frame, including reconstructed residual signal $\hat{r}_Y$ for the luma component, reconstructed residual signal $\hat{r}_U$ for the chroma component $X_U^{(t)}$, and reconstructed residual signal $\hat{r}_V$ for the chroma component $X_V^{(t)}$. The deep learning-based system 600 may add the predictions $p_Y$, $p_U$, $p_V$ to the reconstructed residual $\hat{r}_Y$, $\hat{r}_U$, $\hat{r}_V$ to generated a reconstructed frame 616.

Figure 7A:
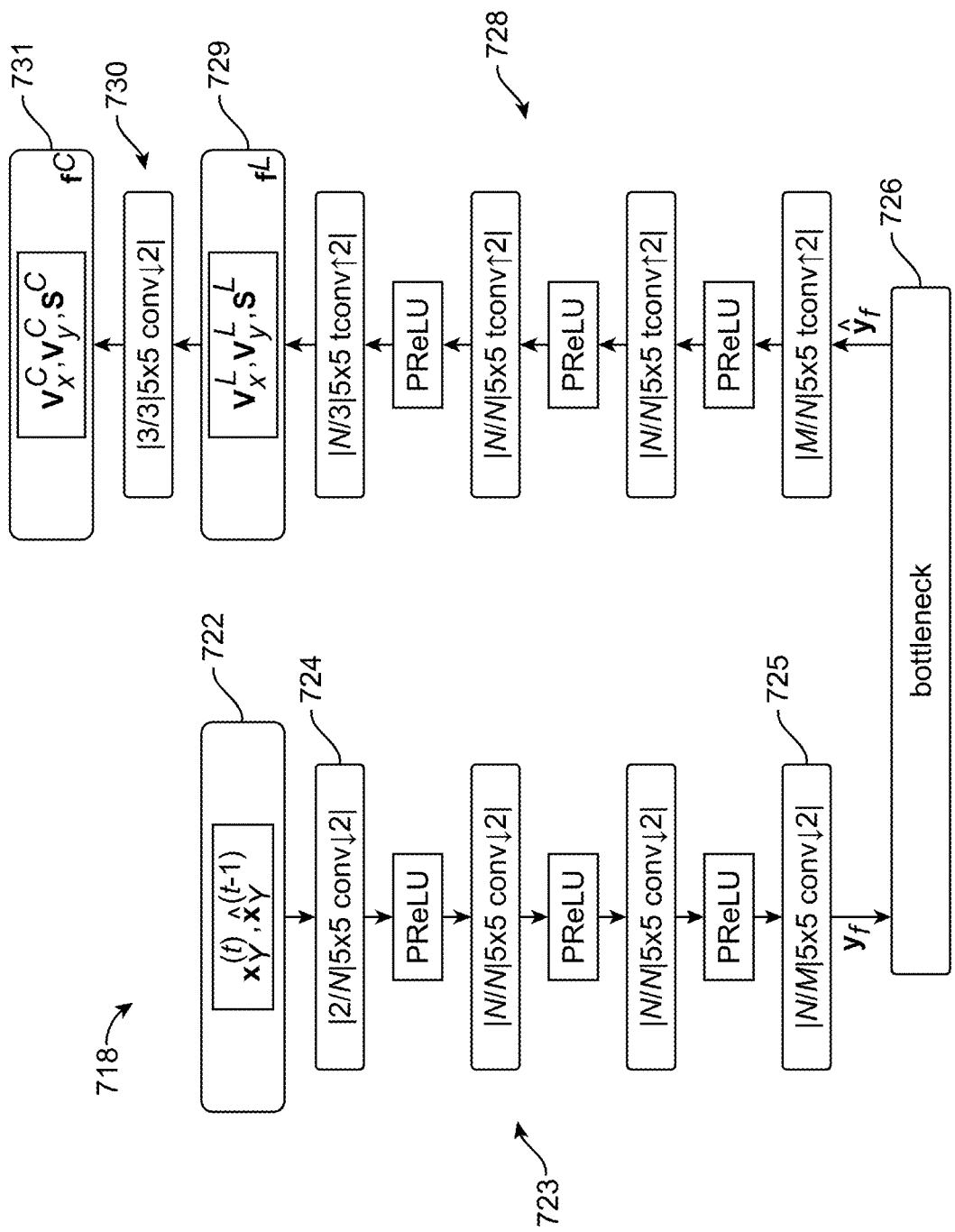
FIG. 7A is a diagram illustrating an example of a machine-learning based flow engine operating with luma input, in accordance with some examples.

FIG. 7A is a diagram illustrating an example of the flow engine 718 operating with a luma component $X_Y^{(t)}$ of a current frame (at time t) and a reconstructed luma component $\hat{X}_Y^{(t-1)}$ of a previous frame (at time t−1), collectively shown as luma components 722. As noted above, in some cases the flow engine 718 can be implemented as an autoencoder ($VAE_{flow}$). In some cases, the combined deep learning-based architecture can be designed where, as shown in FIG. 7A, the flow engine 718 uses the luma component of both the current frame $X_Y^{(t)}$ and the previously reconstructed frame $\hat{X}_Y^{(t-1)}$ to estimate luma motion information (e.g., SSF $f^L$) and chroma motion information (e.g., SSF $f^C$). For example, as described herein, the chroma motion information (e.g., $f^C$) can be derived based on the luma motion information (e.g., $f^L$).

As shown in FIG. 7A, to determine the motion information ($f^L$) for the luma component $X_Y^{(t)}$ of the current frame, the luma component $X_Y^{(t)}$ of the current frame and the reconstructed luma component $\hat{X}_Y^{(t-1)}$ of the previous frame are processed by several convolutional layers and activation layers (collectively shown as a forward pass 723). The "↓2" and "↑2" notation in FIG. 7A refers to stride values, where ↓2 refers to a stride of 2 (for downsampling as indicated by the "↓") and ↑2 also refers to a stride of 2 (for upsampling as indicated by the "↑"). For example, the convolutional layer 724 downsamples the input luma components $X_Y^{(t)}$ and $\hat{X}_Y^{(t-1)}$ by a factor of four by applying a 5×5 convolutional filter in the horizontal and vertical dimensions by a stride value of 2. The resulting output of the convolutional layer 724 is N arrays (corresponding to the N channels) of feature values representing the luma motion information ($f^L$) for the luma component $X_Y^{(t)}$ of the current frame. The notation "2/N" represents 2 input channels and N output channels. The non-linear layer following the convolutional layer 724 can then process the feature values output by the convolutional layer 724. Each of the successive convolutional layers and non-linear layers can process the features output by the previous layer until the final convolutional layer 725 of the forward pass 723 outputs features to the bottleneck portion 726 of the flow engine 718.

The output of the forward pass 723 is processed by the bottleneck portion 726 of the flow engine 718 to generate a bitstream or latent representing the luma motion information ($f^L$) for the luma component $X_Y^{(t)}$ of the current frame. The bottleneck portion 726 may include a quantization engine and an entropy encoding engine in the forward pass 723, and an entropy decoding engine and dequantization engine on a backward pass 728 of the flow engine 718. For example, the quantization engine can perform quantization on the features output by a final convolutional layer 725 of the forward pass 723 to generate a quantized output. The entropy encoding engine can entropy encode the quantized output from the quantization engine to generate a bitstream. In some cases, the entropy encoding engine can use a prior generated by a hyperprior network to perform the entropy encoding. The neural network system can output the bitstream for storage, for transmission to another device, to a server device or system, and/or otherwise output the bitstream.

The backward pass 728 may in some cases be a decoder sub-network of the neural network system of the flow engine 718 or a decoder sub-network of a neural network system of another flow engine (of another device). The entropy decoding engine of the flow engine 718 can entropy decode the bitstream output by the entropy encoding engine of the bottleneck 726 (or an entropy encoding engine of a bottleneck of another flow engine) and output the entropy decoded data to the dequantization engine of the backward pass 728. The entropy decoding engine can use a prior generated by a hyperprior network to perform the entropy decoding. The dequantization engine can dequantize the data.

The convolutional layers and inverse activation layers of the backward pass 728 may then process the dequantized data from the bottleneck 726 to generate motion information 729 ($f^L$) for the luma component $X_Y^{(t)}$ of the current frame. The motion information 729 ($f^L$) can include motion vectors (e.g., having a magnitude in a horizontal or x-direction and a magnitude in a vertical or y-direction), such as a motion vector for each sample of the luma component $X_Y^{(t)}$ of the current frame. In some cases, the motion information 729 ($f^L$) can further include a scale component. For instance, as shown in FIG. 7A for illustrative purposes, the motion information 729 includes a $v_x^L$ component, a $v_y^L$ component, and a $s^L$ component. As noted above, the $v_x^L$, $v_y^L$, and $s^L$ components can be used in equation (1) by the warping engine 622 to warp the pixels of the current frame 614 (at time t) to generate the predictions $p_Y$, $p_U$, $p_V$.

After learning the motion information 729 ($f^L$) for the luma component $X_Y^{(t)}$ of the current frame, the flow engine 718 can determine or predict motion information 731 ($f^C$) for the chroma components of the current frame. For instance, the flow engine 718 may subsample the motion information 729 ($f^L$) for the luma component $X_Y^{(t)}$ in order to obtain the motion information 731 ($f^C$) for the chroma components. The motion information 731 ($f^C$) for the chroma components can include motion vectors (e.g., having a magnitude in a horizontal or x-direction and a magnitude in a vertical or y-direction), such as a motion vector for each sample of the chroma components of the current frame. In some cases, the motion information 731 ($f^C$) can further include a scale component. For instance, as shown in FIG. 7A for illustrative purposes, the motion information 731 ($f^C$) for the chroma components of the current frame includes a $v_x^C$ component, a $v_y^C$ component, and a $s^C$ component. Similar to the motion information 729 ($f^L$) 729 for the luma component, the $v_x^C$, $v_y^C$, and $s^C$ components for the chroma motion information 731 ($f^C$) can be used in equation (1) by the warping engine 622 to warp the pixels of the current frame 614 (at time t) to generate the predictions $p_Y$, $p_U$, $p_V$.

In some aspects, a convolutional layer 730 with down sampling can be trained (e.g., using unsupervised learning or training) to learn the motion information 731 ($f^C$) for the chroma components of the current frame based on the motion information 729 ($f^L$) for the luma component $X_Y^{(t)}$ of the current frame. In one illustrative example, a training set that can be used to train the flow engine 718 can include luma and chroma motion information (as a ground truth). The luma motion information can be input into the neural network of the flow engine 718 and the resulting chroma motion information output from the flow engine 718 can be minimized using the ground truth chroma motion information using a loss function (e.g., a L1 or sum of absolute differences, a L2 norm or sum of squared differences, or other loss function).

The convolutional layer 730 is denoted in FIG. 7A as |3/3|5×5 conv↓2|. The notation "3/3" indicates that there are 3 input channels that result in 3 output channels. As noted above, the "↓2" and "↑2" notation refers to stride values, with ↓2 referring to a stride of 2 for downsampling (as indicated by the "↓") and ↑2 referring to a stride of 2 for upsampling (as indicated by the "↑"). For instance, the convolutional layer 730 downsamples the motion information 729 ($f^L$) for the luma component $X_Y^{(t)}$ by a factor of four (e.g., for YUV 4:2:0 format) by applying a 5×5 convolutional filter in the horizontal and vertical dimensions by a stride value of 2. In some examples, the convolutional layer 730 can be trained to downsample by other factors for other formats (e.g., YUV 4:2:2 format, etc.). The resulting output of the convolutional layer 724 is a 3×3 array (corresponding to the 3 channels) of feature values, which is a downsampled version of the motion information 729 ($f^L$) for the luma component $X_Y^{(t)}$.

In other aspects (not shown in FIG. 7A), the motion information 731 ($f^C$) for the chroma component of the current frame can be obtained by directly subsampling the motion information 729 ($f^L$) for the luma component $X_Y^{(t)}$. For instance, the flow engine 718 can determine the chroma flow without using the convolutional layer 730 to process the luma flow(s). In one illustrative example, instead of the convolutional layer 730, the flow engine 718 can include a subsampler (which can be separate from the neural network of the flow engine 718) that can directly subsample the luma motion information 729 ($f^L$) to obtain the chroma motion information 731 ($f^C$).

Figure 7B:
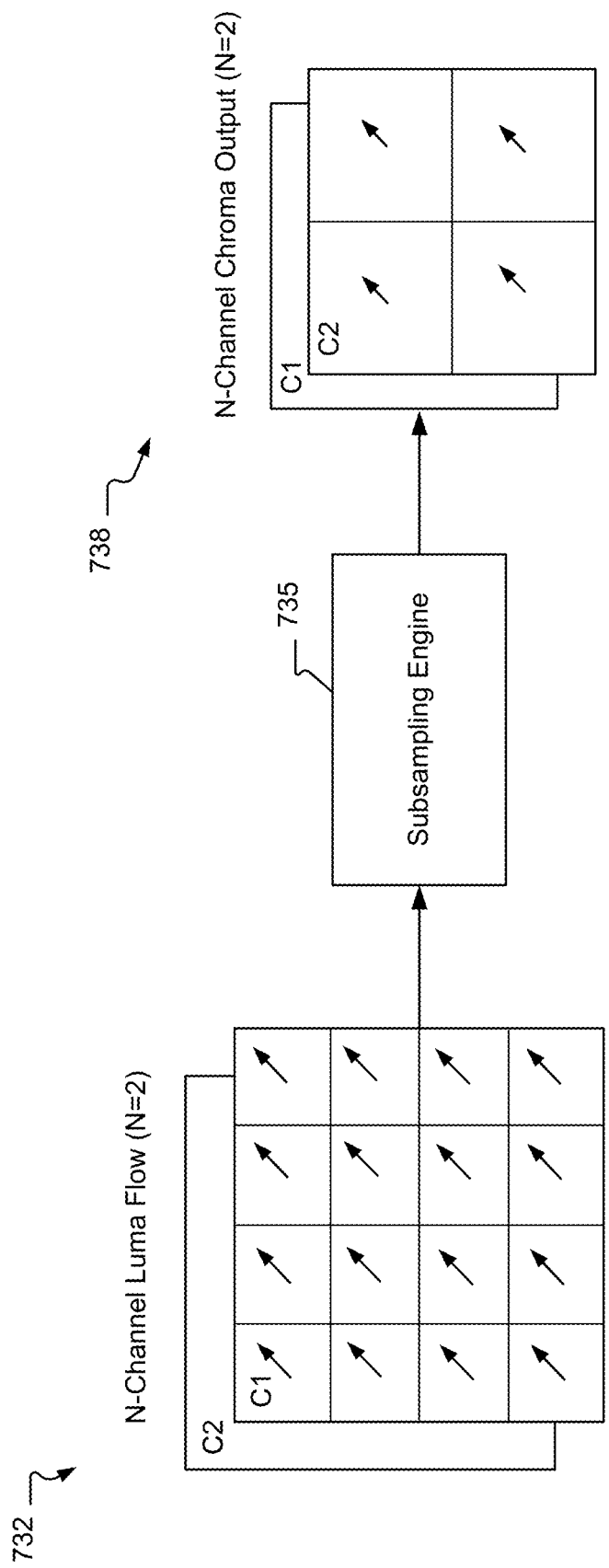
FIG. 7B is a diagram illustrating an example of subsampling of luma motion information to obtain chroma motion information, in accordance with some examples.

FIG. 7B is a diagram illustrating an example of a subsampling engine 735 for subsampling luma motion information determined for a current frame (e.g., using the flow engine 718 of FIG. 7A) to obtain chroma motion information for the current frame. For illustrative purposes, a simplified example is provided with each channel N (with N=2) of the luma motion information 732 having a resolution of 4×4 (four rows and four columns), with a total of sixteen flow motion or displacement vectors. The subsampling engine 735 subsamples or downsamples the luma motion information 732 to generate or obtain chroma motion information 738 that is a subsampled/downsampled version of the luma motion information 732.

The illustrative example of FIG. 7B shows the chroma motion information 738 that is a quarter of the size of the luma motion information 732. For example, as described previously, for content having the YUV 4:2:0 format, the U and V channel resolution is half of the Y channel resolution (the U and V channels have a size that is a quarter of the Y channel, due to the width and height being halved). The subsampling engine 735 can be trained or otherwise configured to handle other formats other than 4:2:0 format, in which case the subsampling may include generating chroma information having different resolutions than that shown in FIG. 7A.

In some aspects, as described above, the subsampling engine 735 can include the convolutional layer 730 of FIG. 7A, which can be trained (e.g., using unsupervised learning or training) to determine the chroma motion information 738 from the luma motion information 732. In other aspects, the subsampling engine 735 can include a subsampler that directly subsamples the luma motion information 732 to obtain the chroma motion information 738.

The number of channels (denoted as N in FIG. 7A) in the convolutional or transform layers of the forward pass 723 and the backward pass 728, as well as in the bottleneck (M), can be set to any suitable value. In one illustrative example, the number of channels N can be selected as N=192 and M=128. The successive smoothed versions of reconstructed frames (associated with the scale field s) can be obtained by using a filtering or smoothing operator. In one example, a Gaussian blurring filter with different widths can be used. In another example, a Gaussian pyramid with successive filtering and interpolation can be used to generate smoothed versions of reconstructed frames. Further, an arbitrarily large number of scales S can be used. In one example, the scales S can be set to S=3, and the scale levels can be selected as $s=[0,\sigma_0^2,\sigma_0^2+(2\sigma_0)^2]$, where $\sigma_0$ can represent Gaussian filter widths.

While the non-linear activation layers in FIG. 7A are shown as PReLUs for illustrative purposes, other types of non-linear activation layers can be used, such as generalized divisive normalization (GDN) layers, a combination of PReLU and GDN layers.

Figure 8A:
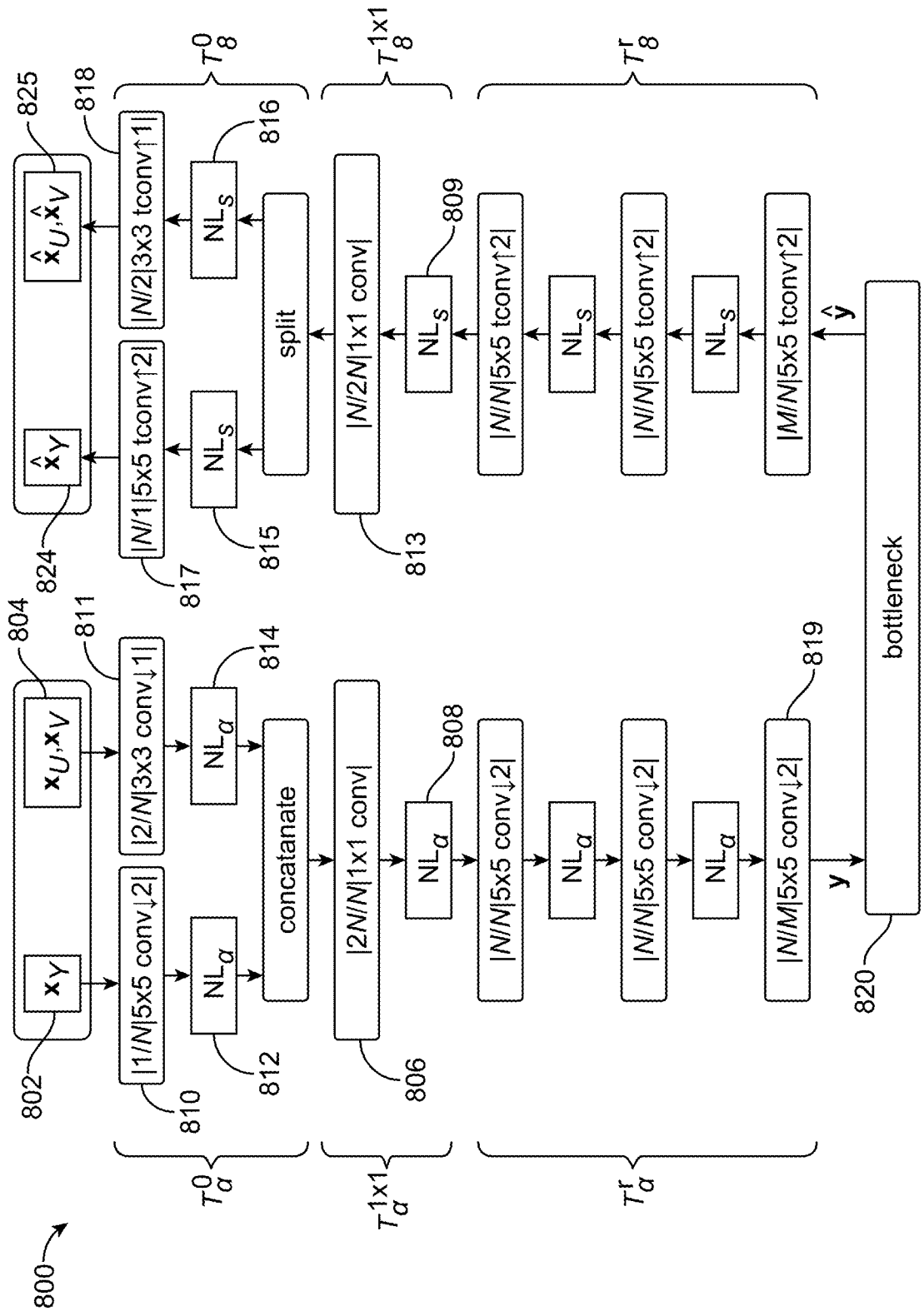
FIG. 8A is a diagram illustrating an example of a machine-learning based architecture with YUV (e.g., YUV 4:2:0) residuals, in accordance with some examples.
Figure 9:
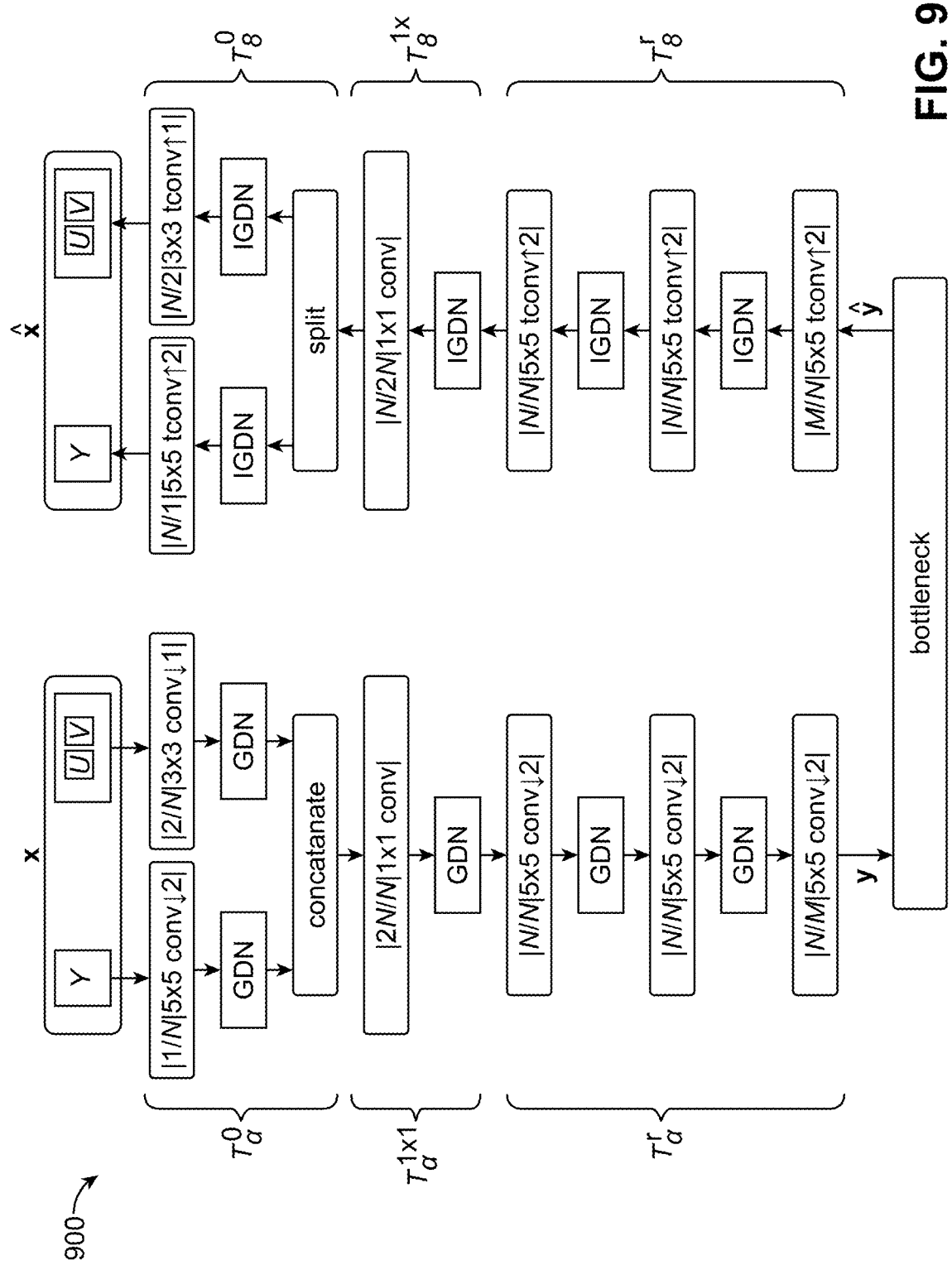
FIG. 9 is a diagram illustrating an example of a machine-learning based architecture architecture (e.g., of an end-to-end neural network based image and video coding system) that directly works with the YUV input (Y, U, and V), such as YUV 4:2:0 input, in accordance with some examples.
Figure 10:
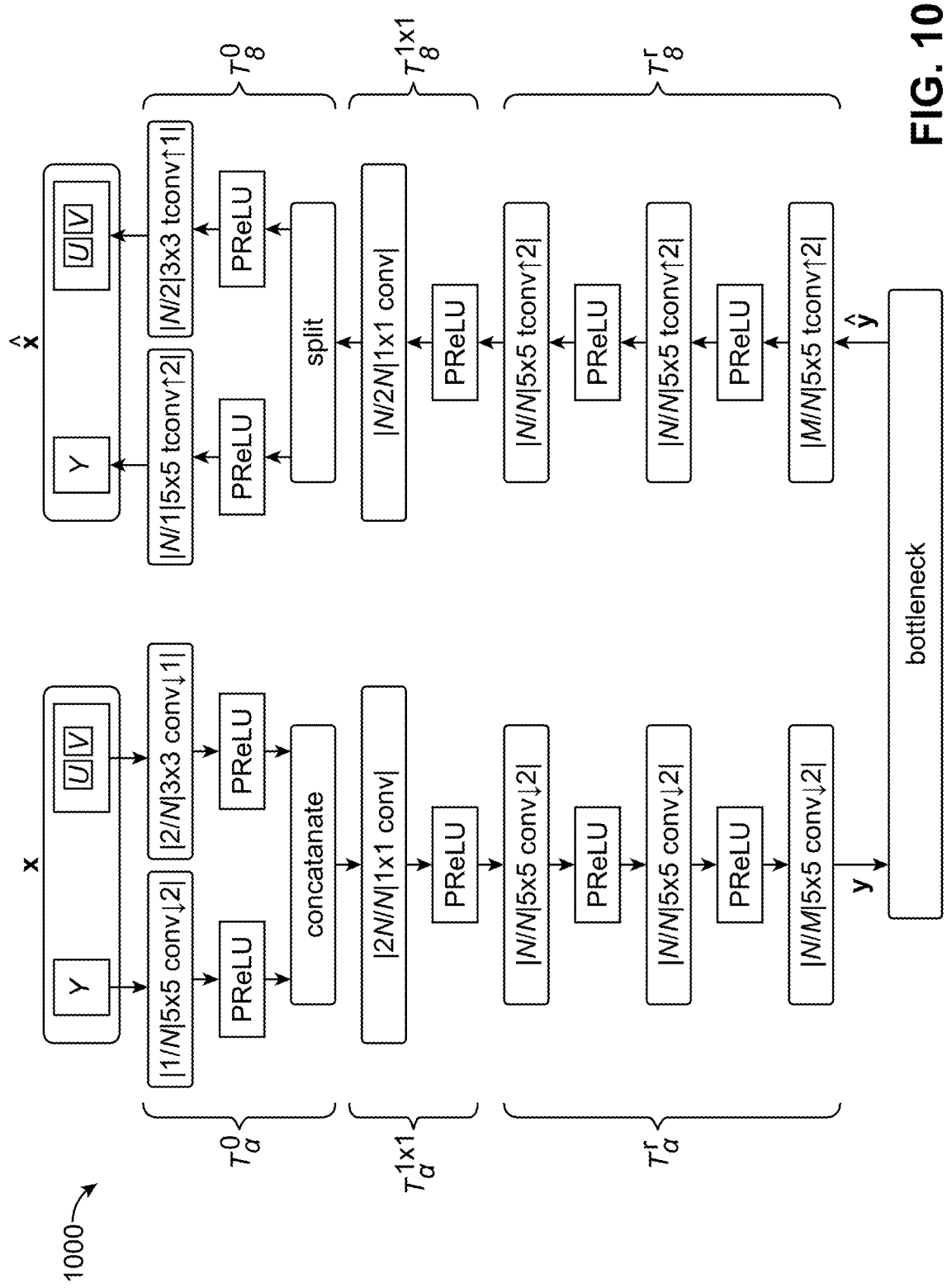
FIG. 10 is a diagram illustrating another example of a machine-learning based architecture (e.g., of an end-to-end neural network based image and video coding system) that directly works with the YUV input (Y, U, and V), such as YUV 4:2:0 input, in accordance with some examples.

In some examples, to effectively support one or more YUV formats (e.g., YUV 4:2:0), the intra-prediction engine 602 and the residual engine 620 of FIG. 6 can be designed based on the general neural network architectures shown in FIG. 8A, FIG. 9, or FIG. 10. For example, the architectures shown in FIG. 8A, FIG. 9, and FIG. 10 can be configured for handling input data having a YUV 4:2:0 format. In some examples, a similar neural network architecture as that shown in FIG. 8A, FIG. 9, or FIG. 10 can be used for encoding and/or decoding other types of YUV content (e.g., content having a YUV 4:4:4 format, a YUV 4:2:2 format, etc.) and/or content having other input formats. In some cases, each of the architectures shown in FIG. 8A, FIG. 9, and FIG. 10 include a residual autoencoder operating with YUV (e.g., 4:2:0) residuals.

FIG. 8A is a diagram illustrating an example of a front-end neural network system 800 that can be configured to work directly with 4:2:0 input (Y, U and V) data. As shown in FIG. 8A, at an encoder sub-network (also referred to as a forward pass) of the neural network system, branched luma and chroma channels (luma Y channel 802 and U and V chroma channels 804) are combined using a 1×1 convolutional layer 806 and then a non-linear layer 808 (also referred to as a non-linear operator) is applied. Similar operations are performed on a decoder sub-network (also referred to as a backward pass) of the neural network system, but in reverse order. For instance, as shown in FIG. 8A, an inverse non-linear layer 809 (also referred to as an inverse non-linear operator) is applied, the Y and U, V channels are separated using a 1×1 convolutional layer 813, and the separate Y and U, V channels are processed using respective inverse non-linear layers 815, 816 and convolutional layers 817, 818.

The first two neural network layers in the encoder sub-network of the neural network system 800 of FIG. 8A include a first convolutional layer 811 (denoted Nconv|3×3|↓1), a second convolutional layer 810 (denoted Nconv|5×5|↓2), a first non-linear layer 814, and a second non-linear layer 812. The last two neural network layers in the decoder sub-network of the front-end neural network architecture of FIG. 8A include a first inverse-non-linear layer 816, a second inverse-non-linear layer 815, a first convolutional layer 818 (denoted 2conv|3×3|↑1) for generating the reconstructed chrominance (U and V) components of a frame, and a second convolutional layer 817 (denoted 1conv|5×5|↑2) for generating the reconstructed luminance (Y) component of the frame. The "Nconv" notation refers to a number (N) of output channels (corresponding to a number of output features) of a given convolutional layer (with the value of N defining the number of output channels). The 3×3 and 5×5 notation indicates the size of the respective convolutional kernels (e.g., a 3×3 kernel and a 5×5 kernel). The "↓1" and "↓2" notation refers to stride values, where ↓1 refers to a stride of 1 (for downsampling as indicated by the "↓") and ↓2 refers to a stride of 1 (for downsampling). The "↑1" and "↑2" notation refers to refers to stride values, where ↑1 refers to a stride of 1 (for upsampling as indicated by the "↑") and ↑2 refers to a stride of 1 (for upsampling).

For example, the convolutional layer 810 downsamples the input luma channel 802 by a factor of four by applying a 5×5 convolutional filter in the horizontal and vertical dimensions by a stride value of 2. The resulting output of the convolutional layer 810 is N arrays (corresponding to the N channels) of feature values. The convolutional layer 811 processes the input chroma (U and V) channel 804 by applying a 3×3 convolutional filter in the horizontal and vertical dimensions by a stride value of 1. The resulting output of the convolutional layer 811 is N arrays (corresponding to the N channels) of feature values. The arrays of feature values output by the convolutional layer 810 have a same dimension as the arrays of feature values output by the convolutional layer 811. The non-linear layer 812 can then process the feature values output by the convolutional layer 810 and the non-linear layer 814 can process the feature values output by the convolutional layer 811.

The 1×1 convolutional layer 806 can then process the feature values output by the non-linear layers 812, 814. The 1×1 convolutional layer 806 can generate a linear combination of the features associated with the luma channel 802 and the chroma channels 804. The linear combination operation operates as a per-value cross-channel mixing of the Y and UV components, resulting in a cross-component (e.g., cross-luminance and chrominance component) prediction that enhances coding performance. Each 1×1 convolutional filter of the 1×1 convolutional layer 806 can include a respective scaling factor that is applied to a corresponding Nth channel of the luma channel 802 and a corresponding Nth channel of the chroma channels 804.

Figure 8B:
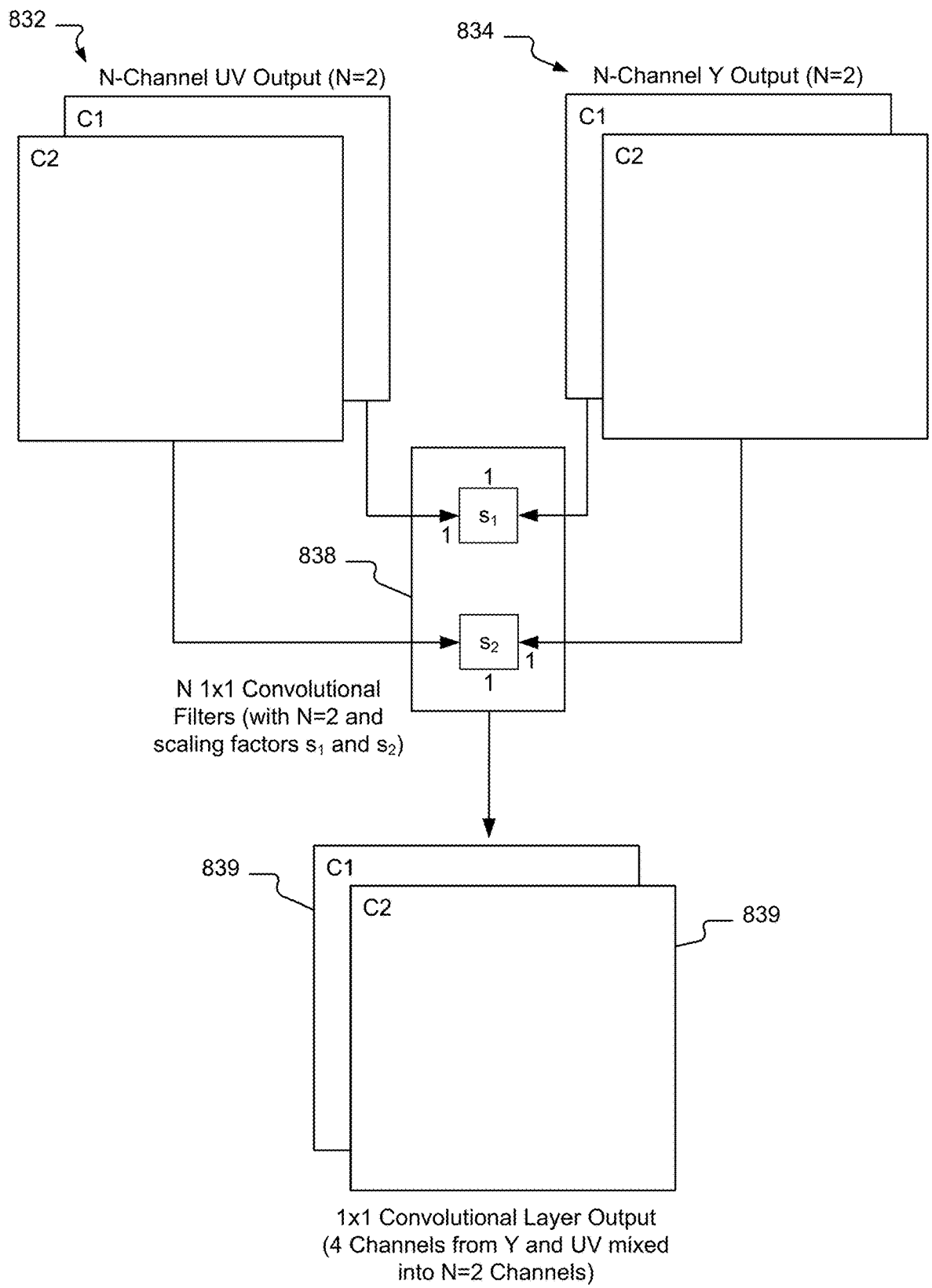
FIG. 8B is a diagram illustrating an example operation of a 1×1 convolutional layer, in accordance with some examples.

FIG. 8B is a diagram illustrating an example operation of a 1×1 convolutional layer 838. As noted above, N represents the number of output channels. As shown in FIG. 8B, 2N channels are provided as input to the 1×1 convolutional layer 838, including an N-channel chroma (combined U and V) output 832 and an N-channel luma (Y) output 834. In the example of FIG. 8B, the value of N is equal to 2, indicating two channels of values for the N-channel chroma output 832 and two channels of values for the N-channel luma output 834. Referring to FIG. 8A, the N-channel chroma output 832 can be the output from the non-linear layer 814, and the N-channel luma output 834 can be the output from the non-linear layer 812.

The 1×1 convolutional layer 838 processes the 2N channels and performs a feature-wise linear combination of the 2N channels, and then outputs an N-channel set of features or coefficients. The 1×1 convolutional layer 838 includes two 1×1 convolutional filters (based on N=2). The first 1×1 convolutional filter is shown with an $s_1$ value and the second 1×1 convolutional filter is shown with an $s_2$ value. The $s_1$ value represents a first scaling factor and the $s_2$ value represents a second scaling factor. In one illustrative example, the $s_1$ value is equal to 3 and the $s_2$ value is equal to 4. Each of the 1×1 convolutional filters of the 1×1 convolutional layer 838 has a stride value of 1, indicating that the scaling factors $s_1$ and $s_2$ will be applied to each value in the UV output 832 and the Y output 834.

For example, the scaling factor $s_1$ of the first 1×1 convolutional filter is applied to each value in the first channel (C1) of the UV output 832 and to each value in the first channel (C1) of the Y output 834. Once each value of the first channel (C1) of the UV output 832 and each value of the first channel (C1) of the Y output 834 are scaled by the scaling factor $s_1$ of the first 1×1 convolutional filter, the scaled values are combined into a first channel (C1) of output values 839. The scaling factor $s_2$ of the second 1×1 convolutional filter is applied to each value in the second channel (C2) of the UV output 832 and to each value in the second channel (C2) of the Y output 834. After each value of the second channel (C2) of the UV output 832 and each value of the second channel (C2) of the Y output 834 are scaled by the scaling factor $s_2$ of the second 1×1 convolutional filter, the scaled values are combined into a second channel (C2) of output values 839. As a result, the four Y and UV channels (two Y channels and two combined UV channels) are mixed or combined into two output channels C1 and C2.

Returning to FIG. 8A, the output of the 1×1 convolutional layer 806 is processed by additional non-linear layers and additional convolutional layers of the encoder sub-network. The bottleneck 820 can include a quantization engine and an entropy encoding engine on the encoder sub-network (or forward pass) and an entropy decoding engine and a dequantization engine on the decoder sub-network (or backward pass). The quantization engine can perform quantization on the features output by a final neural network layer 819 of the encoder sub-network to generate a quantized output. The entropy encoding engine can entropy encode the quantized output from the quantization engine to generate a bitstream. In some cases, the entropy encoding engine can use a prior generated by a hyperprior network to perform the entropy encoding. The neural network system can output the bitstream for storage, for transmission to another device, to a server device or system, and/or otherwise output the bitstream.

The decoder sub-network of the neural network system or a decoder sub-network of another neural network system (of another device) can decode the bitstream. The entropy decoding engine of the bottleneck 820 (of the decoder sub-network) can entropy decode the bitstream and output the entropy decoded data to the dequantization engine of the decoder sub-network. The entropy decoding engine can use a prior generated by a hyperprior network to perform the entropy decoding. The dequantization engine can dequantize the data. The dequantized data can be processed by a number of convolutional layers and a number of inverse non-linear layers of the decoder sub-network.

After being processed by several convolutional and non-linear layers, the 1×1 convolutional layer 813 can process data output by a final inverse non-linear layer 809. The 1×1 convolutional layer 813 can include 2N convolutional filters, which can divide the data into Y channel features and combined UV channel features. For example, each of the N channels output by the inverse non-linear layer 809 can be processed using 2N 1×1 convolutions (resulting in scaling) of the 1×1 convolutional layer 813. For each scaling factor $n_i$ corresponding to an output channel (from a total of 2N output channels) that is applied to the N input channels, the decoder sub-network can perform a summation across the N input channels, resulting in 2N outputs. In one illustrative example, for a scaling factor $n_1$, the decoder sub-network can apply the scaling factor $n_1$ to N input channels and can sum the result, which results in one output channel. The decoder sub-network can perform this operation for 2N different scaling factors (e.g., scaling factor $n_1$, scaling factor $n_2$, through scaling factor $n_{2N}$).

The Y channel features output by the 1×1 convolutional layer 813 can be processed by an inverse non-linear 815. The combined UV channel features output by the 1×1 convolutional layer 813 can be processed by an inverse non-linear 816. A convolutional layer 817 can process the Y channel features and output a reconstructed Y channel per pixel or sample of a reconstructed frame (e.g., luminance samples or pixels), shown as reconstructed Y component 824. A convolutional layer 818 can process the combined UV channel features, and can output a reconstructed U channel per pixel or sample of the reconstructed frame (e.g., chrominance-blue samples or pixels) and a reconstructed V channel per pixel or sample of the reconstructed frame (e.g., chrominance-red samples or pixels), shown as reconstructed U and V components 825.

In some examples, different variants the architecture in FIG. 8A with different non-linearity operators can be used as the intra-prediction engine 602 and residual engine 620. For example, FIG. 9 and FIG. 10 are diagrams illustrating the front-end architecture of FIG. 8A configured for processing data having a YUV format (e.g., YUV 4:2:0 input data having Y, U and V components). In the neural network system 900 of FIG. 9, at the encoder side, branched luma and chroma channels are combined using a 1×1 convolutional layer (similar to that of FIG. 8A) and then a GDN non-linear operator is applied. In the neural network system 1000 FIG. 10, at the encoder side, branched luma and chroma channels are combined using 1×1 convolutional layer (similar to that of FIG. 8A) and then a PReLU non-linear operator is applied. In one example, both $VAE_{res}$ and $VAE_{intra}$ can use the variant shown in FIG. 9. In another example, both $VAE_{res}$ and $VAE_{intra}$ can use the variant in FIG. 10. In another example, $VAE_{res}$ can use the variant in FIG. 9, and $VAE_{intra}$ can use the variant in FIG. 10. In another example, $VAE_{intra}$ can use the variant in FIG. 9, and $VAE_{res}$ can use the variant in FIG. 10.

FIG. 11 is a flow diagram illustrating an example of a process 1100 for processing video data. At block 1102, the process 1100 includes obtaining, by a machine learning system, input video data. The input video data includes at least one luminance component for a current frame (e.g., the luma component $X_Y^{(t)}$ of the current frame (at time t) of FIG. 7A). In some cases, the input video data includes at least one luminance component for a previously-reconstructed frame (e.g., the reconstructed luma component $\hat{X}_Y^{(t-1)}$ of the previous frame (at time t−1) of FIG. 7A), which can be referred to as at least one reconstructed luminance component. In some aspects, the current frame includes a video frame. In some cases, the one or more chrominance components include at least one chrominance-blue component and at least one chrominance-red component. In some aspects, the current frame has a luminance-chrominance (YUV) format. In some cases, the YUV format is a YUV 4:2:0 format.

At block 1104, the process includes determining, by the machine learning system, motion information for the at least one luminance component of the current frame and motion information for one or more chrominance components of the current frame using the at least one luminance component for the current frame. In some aspects, the process 1100 may include determining the motion information for the at least one luminance component of the current frame based on the at least one luminance component of the current frame and the at least one reconstructed luma component of a previous frame. In some cases, the process 1100 may further include determining the motion information for the one or more chrominance components of the current frame using the motion information determined for the at least one luminance component of the current frame. In some cases, the motion information for the one or more chrominance components of the current frame is determined using a convolutional layer of the machine learning system. For instance, referring to FIG. 7A as an illustrative example, the flow engine 718 may use the luma component of both the current frame $X_Y^{(t)}$ and the previously reconstructed frame $\hat{X}_Y^{(t-1)}$ to estimate luma motion information (e.g., SSF $f^L$) and chroma motion information (e.g., SSF $f^C$) for the current frame $X_Y^{(t)}$. As noted above, the chroma motion information (e.g., $f^C$) 731 can be derived based on the luma motion information (e.g., $f^L$) 729 using the convolutional layer 730. In some cases, the motion information for the one or more chrominance components of the current frame is determined at least in part by sampling the motion information determined for the at least one luminance component of the current frame.

In some aspects, the process 1100 includes determining, by the machine learning system using the motion information for the at least one luminance component of the current frame and the motion information for the one or more chrominance components of the current frame, a warping parameter for the at least one luminance component of the current frame and one or more warping parameters for one or more chrominance components of the current frame. In some aspects, the warping parameter for the at least one luminance component of the current frame and the one or more warping parameters for the one or more chrominance components of the current frame include space-scale flow (SSF) warping parameters. In some cases, the space-scale flow (SSF) warping parameters include learned scale-flow vectors. Referring to FIG. 6 as an illustrative example, the warping parameters can include $v_x^*$ that represents a horizontal component (in an x-direction) of a motion or displacement vector, $v_y^*$ that represents a vertical component (in a y-direction) of the motion or displacement vector, and s (referred to as a scale field) that represents a progressively smoothed version of the reconstructed frames that is combined with the spatial motion/displacement information ($v_x$ and $v_y$).

The process 1100 can further include determining one or more inter-frame predictions (e.g., predictors $p_Y$, $p_U$, and $p_V$ of FIG. 6) for the current frame using the warping parameter for the at least one luminance component of the current frame and the one or more warping parameters for the one or more chrominance components of the current frame. In some cases, the one or more inter-frame predictions are determined at least in part by applying an interpolation operation using the warping parameter for the at least one luminance component of the current frame and the one or more warping parameters for the one or more chrominance components of the current frame. In one illustrative example, the interpolation operation includes a trilinear interpolation operation.

In some examples, the processes described herein may be performed by a computing device or apparatus, such as a computing device having the computing device architecture 1200 shown in FIG. 11. In one example, the process or processes can be performed by a computing device with the computing device architecture 1200 implementing the neural network architecture shown in FIG. 6 and/or any one or more of the neural network architectures shown in FIG. 7A, FIG. 7B, FIG. 8A, FIG. 9, and/or FIG. 10. In some examples, the computing device can include or be a part of a mobile device (e.g., a mobile phone, a tablet computing device, etc.), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The processes described herein can be illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
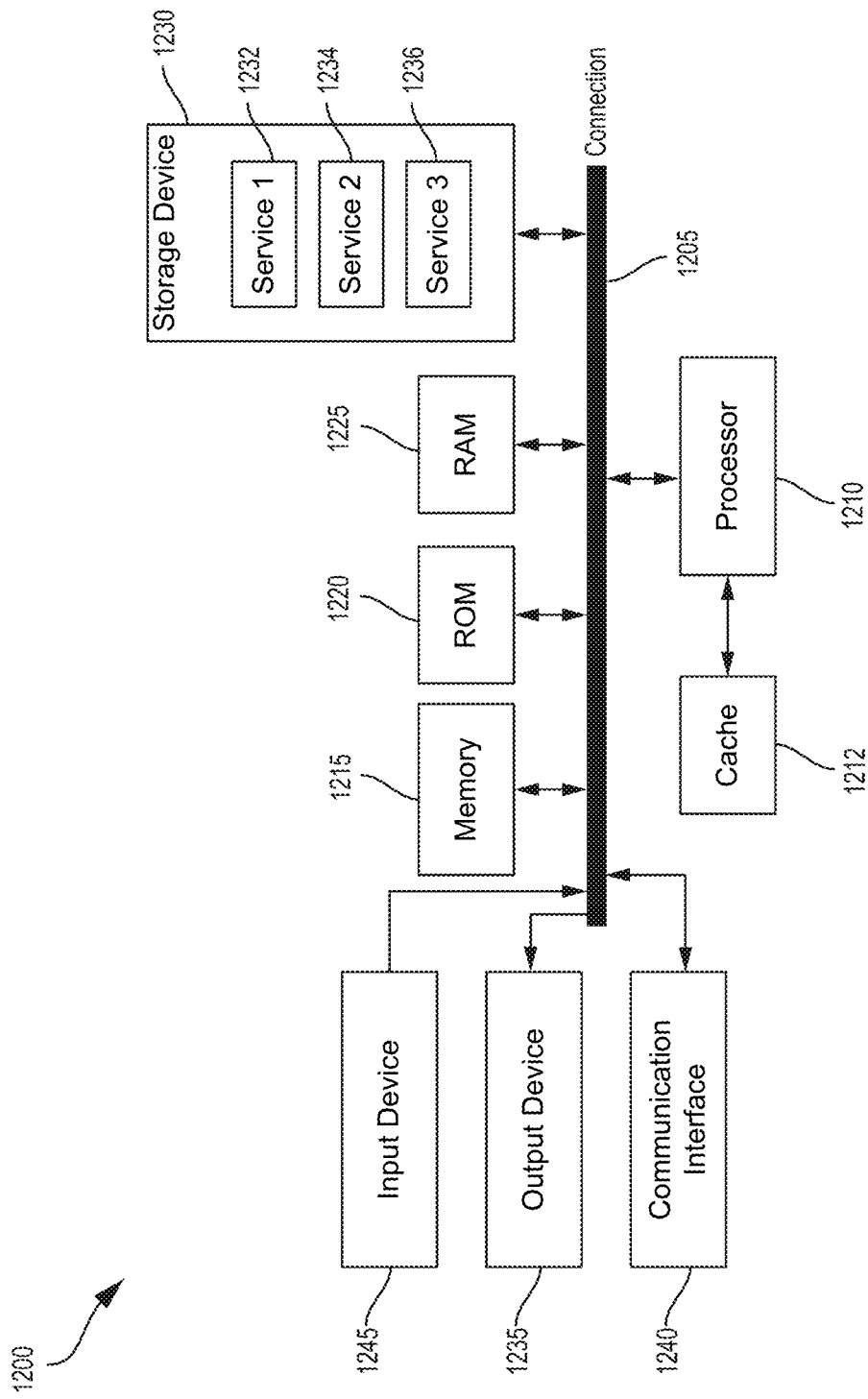
FIG. 12 illustrates an example computing device architecture of an example computing device which can implement the various techniques described herein.

FIG. 12 illustrates an example computing device architecture 1200 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1200 can implement the system of FIG. 6. The components of computing device architecture 1200 are shown in electrical communication with each other using connection 1205, such as a bus. The example computing device architecture 1200 includes a processing unit (CPU or processor) 1210 and computing device connection 1205 that couples various computing device components including computing device memory 1215, such as read only memory (ROM) 1220 and random access memory (RAM) 1225, to processor 1210.

Computing device architecture 1200 can include a cache of high-speed memory connected directly with, in close proximity to, or integrated as part of processor 1210. Computing device architecture 1200 can copy data from memory 1215 and/or the storage device 1230 to cache 1212 for quick access by processor 1210. In this way, the cache can provide a performance boost that avoids processor 1210 delays while waiting for data. These and other modules can control or be configured to control processor 1210 to perform various actions. Other computing device memory 1215 may be available for use as well. Memory 1215 can include multiple different types of memory with different performance characteristics. Processor 1210 can include any general purpose processor and a hardware or software service, such as service 1 1232, service 2 1234, and service 3 1236 stored in storage device 1230, configured to control processor 1210 as well as a special-purpose processor where software instructions are incorporated into the processor design. Processor 1210 may be a self-contained system, containing multiple cores or processors, a bus, memory controller, cache, etc. A multi-core processor may be symmetric or asymmetric.

To enable user interaction with the computing device architecture 1200, input device 1245 can represent any number of input mechanisms, such as a microphone for speech, a touch-sensitive screen for gesture or graphical input, keyboard, mouse, motion input, speech and so forth. Output device 1235 can also be one or more of a number of output mechanisms known to those of skill in the art, such as a display, projector, television, speaker device, etc. In some instances, multimodal computing devices can enable a user to provide multiple types of input to communicate with computing device architecture 1200. Communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. Storage device 1230 can include services 1232, 1234, 1236 for controlling processor 1210. Other hardware or software modules are contemplated. Storage device 1230 can be connected to the computing device connection 1205. In one aspect, a hardware module that performs a particular function can include the software component stored in a computer-readable medium in connection with the necessary hardware components, such as processor 1210, connection 1205, output device 1235, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. A method of processing video data, the method comprising: obtaining, by a machine learning system, input video data, the input video data including at least one luminance component for a current frame; and determining, by the machine learning system, motion information for the at least one luminance component of the current frame and motion information for one or more chrominance components of the current frame using the at least one luminance component for the current frame.

Aspect 2. The method of Aspect 1, further comprising: determining, by the machine learning system using the motion information for the at least one luminance component of the current frame and the motion information for the one or more chrominance components of the current frame, a warping parameter for the at least one luminance component of the current frame and one or more warping parameters for one or more chrominance components of the current frame; and determining one or more inter-frame predictions for the current frame using the warping parameter for the at least one luminance component of the current frame and the one or more warping parameters for the one or more chrominance components of the current frame.

Aspect 3. The method of Aspect 2, wherein the one or more inter-frame predictions are determined at least in part by applying an interpolation operation using the warping parameter for the at least one luminance component of the current frame and the one or more warping parameters for the one or more chrominance components of the current frame.

Aspect 4. The method of Aspect 3, wherein the interpolation operation includes a trilinear interpolation operation.

Aspect 5. The method of any of Aspects 2 to 4, wherein the warping parameter for the at least one luminance component of the current frame and the one or more warping parameters for the one or more chrominance components of the current frame include space-scale flow (SSF) warping parameters.

Aspect 6. The method of Aspect 5, wherein the SSF warping parameters include learned scale-flow vectors.

Aspect 7. The method of any of Aspects 1 to 6, determining the motion information for the at least one luminance component of the current frame and the motion information for the one or more chrominance components of the current frame using the at least one luminance component for the current frame includes: determining the motion information for the at least one luminance component of the current frame based on the at least one luminance component of the current frame and at least one reconstructed luma component of a previous frame; and determining the motion information for the one or more chrominance components of the current frame using the motion information determined for the at least one luminance component of the current frame.

Aspect 8. The method of Aspect 7, wherein the motion information for the one or more chrominance components of the current frame is determined using a convolutional layer of the machine learning system.

Aspect 9. The method of Aspect 7, wherein the motion information for the one or more chrominance components of the current frame is determined at least in part by sampling the motion information determined for the at least one luminance component of the current frame.

Aspect 10. The method of any of Aspects 1 to 9, wherein the current frame includes a video frame.

Aspect 11. The method of any of Aspects 1 to 10, wherein the one or more chrominance components include at least one chrominance-blue component and at least one chrominance-red component.

Aspect 12. The method of any of Aspects 1 to 11, wherein the current frame has a luminance-chrominance (YUV) format.

Aspect 13. The method of Aspect 12, wherein the YUV format is a YUV 4:2:0 format.

Aspect 14. An apparatus for processing video data, comprising: at least one memory; and one or more processors coupled to the at least one memory, the one or more processors configured to: obtain, using a machine learning system, input video data, the input video data including at least one luminance component for a current frame; and determine, using the machine learning system, motion information for the at least one luminance component of the current frame and motion information for one or more chrominance components of the current frame using the at least one luminance component for the current frame.

Aspect 15. The apparatus of Aspect 14, wherein the one or more processors are configured to: determine, using the machine learning system based on the motion information for the at least one luminance component of the current frame and the motion information for the one or more chrominance components of the current frame, a warping parameter for the at least one luminance component of the current frame and one or more warping parameters for one or more chrominance components of the current frame; and determine one or more inter-frame predictions for the current frame using the warping parameter for the at least one luminance component of the current frame and the one or more warping parameters for the one or more chrominance components of the current frame.

Aspect 16. The apparatus of Aspect 15, wherein the one or more inter-frame predictions are determined at least in part by applying an interpolation operation using the warping parameter for the at least one luminance component of the current frame and the one or more warping parameters for the one or more chrominance components of the current frame.

Aspect 17. The apparatus of Aspect 16, wherein the interpolation operation includes a trilinear interpolation operation.

Aspect 18. The apparatus of any of Aspects 15 to 17, wherein the warping parameter for the at least one luminance component of the current frame and the one or more warping parameters for the one or more chrominance components of the current frame include space-scale flow (SSF) warping parameters.

Aspect 19. The apparatus of Aspect 18, wherein the SSF warping parameters include learned scale-flow vectors.

Aspect 20. The apparatus of any of Aspects 14 to 19, wherein, to determine the motion information for the at least one luminance component of the current frame and the motion information for the one or more chrominance components of the current frame using the at least one luminance component for the current frame, the one or more processors are configured to: determine the motion information for the at least one luminance component of the current frame based on the at least one luminance component of the current frame and at least one reconstructed luma component of a previous frame; and determine the motion information for the one or more chrominance components of the current frame using the motion information determined for the at least one luminance component of the current frame.

Aspect 21. The apparatus of Aspect 20, wherein the motion information for the one or more chrominance components of the current frame is determined using a convolutional layer of the machine learning system.

Aspect 22. The apparatus of Aspect 20, wherein, to determine the motion information for the one or more chrominance components of the current frame, the one or more processors are configured to sample the motion information determined for the at least one luminance component of the current frame.

Aspect 23. The apparatus of any of Aspects 14 to 22, wherein the current frame includes a video frame.

Aspect 24. The apparatus of any of Aspects 14 to 23, wherein the one or more chrominance components include at least one chrominance-blue component and at least one chrominance-red component.

Aspect 25. The apparatus of Aspect 14 to 24, wherein the current frame has a luminance-chrominance (YUV) format.

Aspect 26. The apparatus of Aspect 25, wherein the YUV format is a YUV 4:2:0 format.

Aspect 27. The apparatus of any of Aspects 14 to 26, further comprising at least one camera configured to capture one or more frames.

Aspect 28. The apparatus of any of Aspects 14 to 27, further comprising at least one display configured to display one or more frames.

Aspect 29. The apparatus of any of Aspects 14 to 28, wherein the apparatus includes a mobile device.

Aspect 30: A computer-readable storage medium storing instructions that, when executed, cause one or more processors to perform any of the operations of aspects 1 to 29.

Aspect 31: An apparatus comprising means for performing any of the operations of aspects 1 to 29.

What is claimed is:

1. A method of processing video data, the method comprising:
   obtaining, by a machine learning system, a latent representation of at least one luminance component for a current frame, the latent representation of the at least one luminance component of the current frame being based on the at least one luminance component of the current frame and at least one reconstructed luma component of a previous frame;
   determining, by the machine learning system, motion information for the at least one luminance component of the current frame using the latent representation of the at least one luminance component of the current frame; and
   determining, using the machine learning system, motion information for one or more chrominance components of the current frame using the motion information determined for the at least one luminance component for the current frame.

2. The method of claim 1, further comprising:
   determining, by the machine learning system using the motion information for the at least one luminance component of the current frame and the motion information for the one or more chrominance components of the current frame, a warping parameter for the at least one luminance component of the current frame and one or more warping parameters for one or more chrominance components of the current frame; and
   determining one or more inter-frame predictions for the current frame using the warping parameter for the at least one luminance component of the current frame and the one or more warping parameters for the one or more chrominance components of the current frame.

3. The method of claim 2, wherein the one or more inter-frame predictions are determined at least in part by applying an interpolation operation using the warping parameter for the at least one luminance component of the current frame and the one or more warping parameters for the one or more chrominance components of the current frame.

4. The method of claim 3, wherein the interpolation operation includes a trilinear interpolation operation.

5. The method of claim 2, wherein the warping parameter for the at least one luminance component of the current frame and the one or more warping parameters for the one or more chrominance components of the current frame include space-scale flow (SSF) warping parameters.

6. The method of claim 5, wherein the SSF warping parameters include learned scale-flow vectors.

7. The method of claim 1, wherein the motion information for the one or more chrominance components of the current frame is determined using a convolutional layer of the machine learning system.

8. The method of claim 1, wherein the motion information for the one or more chrominance components of the current frame is determined at least in part by sampling the motion information determined for the at least one luminance component of the current frame.

9. The method of claim 1, wherein the current frame includes a video frame.

10. The method of claim 1, wherein the one or more chrominance components include at least one chrominance-blue component and at least one chrominance-red component.

11. The method of claim 1, wherein the current frame has a luminance-chrominance (YUV) format.

12. The method of claim 11, wherein the YUV format is a YUV 4:2:0 format.

13. An apparatus for processing video data, comprising:
at least one memory; and
one or more processors coupled to the at least one memory, the one or more processors configured to:
  obtain, using a machine learning system, a latent representation of at least one luminance component for a current frame the latent representation of the at least one luminance component of the current frame being based on the at least one luminance component of the current frame and at least one reconstructed luma component of a previous frame;
  determine, using the machine learning system, motion information for the at least one luminance component of the current frame using the latent representation of the at least one luminance component of the current frame; and
  determine, using the machine learning system, motion information for one or more chrominance components of the current frame using the motion information determined for the at least one luminance component for the current frame.

14. The apparatus of claim 13, wherein the one or more processors are configured to:
  determine, using the machine learning system based on the motion information for the at least one luminance component of the current frame and the motion information for the one or more chrominance components of the current frame, a warping parameter for the at least one luminance component of the current frame and one or more warping parameters for one or more chrominance components of the current frame; and
  determine one or more inter-frame predictions for the current frame using the warping parameter for the at least one luminance component of the current frame and the one or more warping parameters for the one or more chrominance components of the current frame.

15. The apparatus of claim 14, wherein the one or more inter-frame predictions are determined at least in part by applying an interpolation operation using the warping parameter for the at least one luminance component of the current frame and the one or more warping parameters for the one or more chrominance components of the current frame.

16. The apparatus of claim 15, wherein the interpolation operation includes a trilinear interpolation operation.

17. The apparatus of claim 14, wherein the warping parameter for the at least one luminance component of the current frame and the one or more warping parameters for the one or more chrominance components of the current frame include space-scale flow (SSF) warping parameters.

18. The apparatus of claim 17, wherein the SSF warping parameters include learned scale-flow vectors.

19. The apparatus of claim 13, wherein the motion information for the one or more chrominance components of the current frame is determined using a convolutional layer of the machine learning system.

20. The apparatus of claim 13, wherein, to determine the motion information for the one or more chrominance components of the current frame, the one or more processors are configured to sample the motion information determined for the at least one luminance component of the current frame.

21. The apparatus of claim 13, wherein the current frame includes a video frame.

22. The apparatus of claim 13, wherein the one or more chrominance components include at least one chrominance-blue component and at least one chrominance-red component.

23. The apparatus of claim 13, wherein the current frame has a luminance-chrominance (YUV) format.

24. The apparatus of claim 23, wherein the YUV format is a YUV 4:2:0 format.

25. The apparatus of claim 13, further comprising at least one camera configured to capture one or more frames.

26. The apparatus of claim 13, further comprising at least one display configured to display one or more frames.

27. The apparatus of claim 13, wherein the apparatus includes a mobile device.

28. A non-transitory computer-readable medium having stored thereon instructions that, when executed by one or more processors, cause the one or more processors to:
  obtain, using a machine learning system, a latent representation of at least one luminance component for a current frame, the latent representation of the at least one luminance component of the current frame being based on the at least one luminance component of the current frame and at least one reconstructed luma component of a previous frame;
  determine, using the machine learning system, motion information for the at least one luminance component of the current frame using the latent representation of the at least one luminance component of the current frame; and
  determine, using the machine learning system, motion information for one or more chrominance components of the current frame using the motion information determined for the at least one luminance component for the current frame.

29. The method of claim 1, wherein the input video data does not include a latent representation of luminance component for a current frame.

30. The apparatus of claim 13, wherein the input video data does not include a latent representation of luminance component for a current frame.

* * * * *